(12) United States Patent
Ishii et al.

(10) Patent No.: US 8,465,353 B2
(45) Date of Patent: Jun. 18, 2013

(54) GAME DEVICE, CONTROL METHOD FOR GAME DEVICE, AND INFORMATION STORAGE MEDIUM

(75) Inventors: Koji Ishii, Tokyo (JP); Junichi Taya, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 215 days.

(21) Appl. No.: 12/880,825

(22) Filed: Sep. 13, 2010

(65) Prior Publication Data

US 2011/0065508 A1 Mar. 17, 2011

(30) Foreign Application Priority Data

Sep. 14, 2009 (JP) ................................. 2009-212536

(51) Int. Cl.
*A63F 13/00* (2006.01)
(52) U.S. Cl.
USPC ........................................ 463/4; 463/2; 463/3
(58) Field of Classification Search
USPC ........................................................ 463/2–4
See application file for complete search history.

(56) References Cited

U.S. PATENT DOCUMENTS

| | | | | |
|---|---|---|---|---|
| 5,435,554 A | * | 7/1995 | Lipson | 463/3 |
| 6,244,956 B1 | * | 6/2001 | Nakayama et al. | 463/3 |
| 6,280,323 B1 | * | 8/2001 | Yamazaki et al. | 463/4 |
| 6,719,628 B2 | * | 4/2004 | Okishio et al. | 463/3 |
| 7,270,601 B2 | * | 9/2007 | Takahashi et al. | 463/3 |
| 7,918,730 B2 | * | 4/2011 | Brosnan et al. | 463/32 |
| 8,147,331 B2 | * | 4/2012 | Yokoyama | 463/36 |
| 2006/0217197 A1 | * | 9/2006 | Biheller | 463/36 |
| 2008/0248872 A1 | * | 10/2008 | Endo | 463/36 |
| 2009/0163275 A1 | * | 6/2009 | Ishii et al. | 463/31 |

FOREIGN PATENT DOCUMENTS

JP 2005-245784 A 9/2005

\* cited by examiner

*Primary Examiner* — Dmitry Suhol
*Assistant Examiner* — David Duffy
(74) *Attorney, Agent, or Firm* — Sughrue Mion, PLLC

(57) ABSTRACT

Provided is a game device for executing a game of a sport to be played by using a moving object including: a position acquiring section for acquiring an initial position of the moving object when the moving object starts to move in a game space; a direction acquiring section for acquiring an initial direction of the moving object when the moving object starts to move in the game space; and a movement control section for causing the moving object to start to move based on the initial position acquired by the position acquiring section and the initial direction acquired by the direction acquiring section, to thereby move the moving object, in which the movement control section changes a moving direction of the moving object a plurality of times to a moving direction determined based on an original moving direction of the moving object and a random number.

15 Claims, 14 Drawing Sheets

FIG.11

| No | NUMBER OF FRAMES | CHANGE HISTORY DATA |
|---|---|---|
| 1 | 10 | +3° |
| 2 | 20 | +4° |
| 3 | 30 | +2° |
| ⋮ | ⋮ | ⋮ |

GAME DEVICE, CONTROL METHOD FOR GAME DEVICE, AND INFORMATION STORAGE MEDIUM

CROSS-REFERENCE TO RELATED APPLICATION

The present application claims priority from Japanese application JP 2009-212536 filed on Sep. 14, 2009, the content of which is hereby incorporated by reference into this application.

BACKGROUND OF THE INVENTION

1. Field of the Invention

The present invention relates to a game device, a control method for a game device, and an information storage medium.

2. Description of the Related Art

Conventionally, there is known a game device which displays, on a game screen, the whole or a part of a game space in which a plurality of objects are located. To take a game device for executing a game of a sport to be played by using a moving object (for example, a ball or a puck) as an example, the whole or a part of a game space in which objects are located like a real sport match is displayed on a game screen.

For example, in a free kick scene of a soccer game, player objects representing a kicker player and defense players, a soccer ball object, a goal object, and the like are displayed on the game screen. The user operates a controller to determine a position at which a shot is to be aimed. Then, when the user inputs a predetermined instruction via the controller, the player object starts a run up to make a shot. There is known a game device which allows a player object to make a fake action at the time of free-kick shooting (see JP 2005-245784 A).

SUMMARY OF THE INVENTION

In a real sport match, the highly-skilled players have various kinds of techniques. For example, in a soccer free kick, the poorly-skilled players are only capable of curving a ball with a simple arc or kicking a straight shot, but the highly-skilled players are capable of kicking a so-called knuckle shot. When a player kicks a ball to make a knuckle shot, the ball is kept substantially in a non-spinning state while the ball is in the air. The knuckle shot forms an unpredictable trajectory due to change in air resistance around the ball.

For example, in the soccer game described above, if the user is allowed to give an instruction for the knuckle shot, it becomes possible to make the user experience a play that seems like a play performed by a highly-skilled star player. In this regard, as a method for realizing the knuckle shot in a soccer game, the following method is conceivable. That is, physical simulation is arithmetically performed to show a situation in which the ball substantially in a non-spinning state forms an unpredictable trajectory. However, though it is possible to show the trajectory of a knuckle shot through arithmetically performing the physical simulation, the processing load on the game device is increased due to complicated calculation.

The present invention has been made in view of the above-mentioned problem, and therefore has an object to provide a game device, a control method for a game device, and an information storage medium, which are capable of showing, in a game of a sport to be played by using a moving object, a situation in which the moving object substantially in a non-spinning state forms an unpredictable trajectory while achieving reduction in processing load.

In order to solve the above-mentioned problem, according to the present invention there is provided a game device for executing a game of a sport to be played by using a moving object including: position acquiring means for acquiring an initial position of the moving object when the moving object starts to move in a game space; direction acquiring means for acquiring an initial direction of the moving object when the moving object starts to move in the game space; and control means for causing the moving object to start to move based on the initial position acquired by the position acquiring means and the initial direction acquired by the direction acquiring means, to thereby move the moving object, in which the control means includes change means for changing a moving direction of the moving object a plurality of times to a moving direction determined based on an original moving direction of the moving object and a random number.

Further, according to the present invention, there is provided a control method for a game device for executing a game of a sport to be played by using a moving object, the method including: a position acquiring step of acquiring an initial position of the moving object when the moving object starts to move in a game space; a direction acquiring step of acquiring an initial direction of the moving object when the moving object starts to move in the game space; and a control step of causing the moving object to start to move based on the initial position and the initial direction, to thereby move the moving object, in which the control step includes a change step of changing a moving direction of the moving object a plurality of times to a moving direction determined based on an original moving direction of the moving object and a random number.

Further, according to the present invention, there is provided a program for causing a computer to function as a game device for executing a game of a sport to be played by using a moving object, the program further causing the computer to function as: position acquiring means for acquiring an initial position of the moving object when the moving object starts to move in a game space; direction acquiring means for acquiring an initial direction of the moving object when the moving object starts to move in the game space; and control means for causing the moving object to start to move based on the initial position acquired by the position acquiring means and the initial direction acquired by the direction acquiring means, to thereby move the moving object, in which the control means functions as change means for changing a moving direction of the moving object a plurality of times to a moving direction determined based on an original moving direction of the moving object and a random number. The computer is a personal computer, a server computer, a home-use game machine, an arcade game machine, a portable game machine, a mobile phone, a personal digital assistant, or the like. Further, an information storage medium according to the present invention is a computer-readable information storage medium having the above-mentioned program recorded thereon.

According to the present invention, it is possible to show, in the game of a sport to be played by using the moving object, the situation in which the moving object substantially in the non-spinning state forms an unpredictable trajectory while achieving reduction in processing load.

Further, according to an aspect of the present invention, the control means may further include change restricting means for restricting the change means from changing the moving direction in a case where a moving speed of the moving object is equal to or lower than a reference value.

Further, according to another aspect of the present invention, the control means may further include vertical position changing means for performing, in a case where a position of the moving object in a vertical direction, which is acquired through predetermined arithmetic processing, is lower than an immediately-previous position of the moving object in the vertical direction, control so that the moving object is positioned lower in the vertical direction than the position of the moving object in the vertical direction, which is acquired through the predetermined arithmetic processing.

Further, according to a further aspect of the present invention, the game device may further include storage means for storing a change history to which the moving direction changed by the change means is added, and the control means may further include means for changing the moving direction of the moving object based on the change history.

Further, according to a still further aspect of the present invention, the game device may further include a pointing device for inputting position data regarding a position on a game screen, which is specified by a user, and when a first input is received from the pointing device, causes a game character to start a preparation action, the direction acquiring means may acquire the initial direction based on the position data input at a reference time after the game character starts the preparation action, and the game device may further include vibration instruction means for causing, in a case where a predetermined condition is satisfied, the pointing device to vibrate in a period starting when the game character starts the preparation action and ending when the reference time is reached.

Further, according to a yet further aspect of the present invention, the game device may further include a pointing device for inputting position data regarding a position on a game screen, which is specified by a user, and display control means for displaying an indicator at a position corresponding to the position data. The direction acquiring means may acquire the initial direction based on the position data, and the display control means may display, in a case where a predetermined condition is satisfied, the indicator at a position displaced from the position corresponding to the position data.

Further, according to a yet further aspect of the present invention, the change means may include determination means for determining the moving direction of the moving object for every predetermined number of frames based on the original moving direction of the moving object and the random number after the control means causes the moving object to start to move, and may change the moving direction of the moving object to the determined moving direction.

Further, according to a yet further aspect of the present invention, the change means may include trajectory calculating means for calculating, before the control means causes the moving object to start to move, a trajectory along which the moving object is to move, the control means may cause the moving object to move based on the trajectory calculated by the trajectory calculating means, and the trajectory calculating means may include determination means for determining the moving direction of the moving object for every predetermined time period based on the original moving direction of the moving object and the random number, and may calculate the trajectory based on the determined moving direction.

BRIEF DESCRIPTION OF THE DRAWINGS

In the accompanying drawings:

FIG. 11 is a data storage example of a change history;

DETAILED DESCRIPTION OF THE INVENTION

1. First Embodiment

Hereinafter, detailed description is given of a first embodiment of the present invention based on the drawings. A game device according to the first embodiment of the present invention is implemented by, for example, a home-use game machine (stationary type game machine), a portable game machine, a mobile phone, a personal digital assistant (PDA), or a personal computer. Herein, description is given of a case where the game device according to the first embodiment of the present invention is implemented by a home-use game machine.

1-1. Hardware Configuration of Game Device

Figure 1:
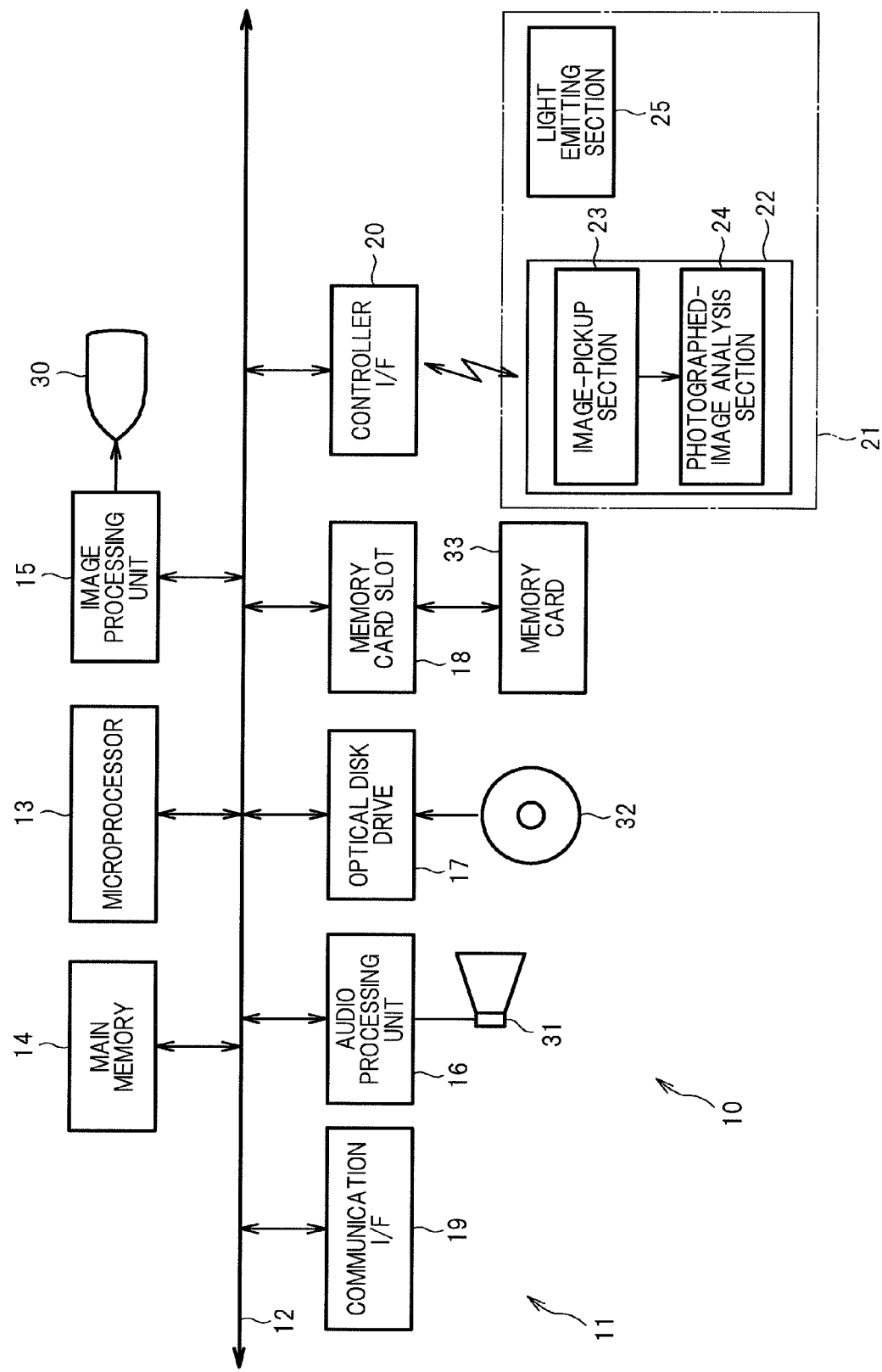
FIG. 1 is a diagram illustrating a hardware configuration of a game device according to embodiments of the present invention.

FIG. 1 illustrates a hardware configuration of the game device according to the first embodiment of the present invention. A game device 10 illustrated in FIG. 1 includes a home-use game machine 11, a display unit 30, an audio outputting unit 31, an optical disk 32, and a memory card 33. The display unit 30 and the audio outputting unit 31 are connected to the home-use game machine 11. The optical disk 32 and the memory card 33 are information storage media, and mounted to the home-use game machine 11. Used as the display unit 30 is, for example, a household television set. Used as the audio outputting unit 31 is, for example, a speaker built into the household television set. Used as the optical disk 32 is, for example, a CD-ROM or a DVD-ROM.

The home-use game machine 11 is a well-known computer game system. The home-use game machine 11 includes a bus 12, a microprocessor 13, a main memory 14, an image processing unit 15, an audio processing unit 16, an optical disk drive 17, a memory card slot 18, a communication interface (I/F) 19, a controller interface (I/F) 20, and an operation inputting unit 21. The constituent components other than the operation inputting unit 21 are accommodated in a casing of the home-use game machine 11.

The bus 12 is a communication path used for communicating addresses and data among the units of the home-use game machine 11. The microprocessor 13, the main memory 14, the image processing unit 15, the audio processing unit 16, the optical disk drive 17, the memory card slot 18, the communication interface 19, and the controller interface 20 are connected via the bus 12 so as to communicate data with one another.

The microprocessor 13 controls the individual units of the home-use game machine 11 based on an operating system stored in a read only memory (ROM) (not shown) or the like, and a program or data read from the optical disk 32 or the memory card 33.

The main memory 14 includes a random access memory (RAM). The program or data read from the optical disk 32 or the memory card 33 is written to the main memory 14 if necessary. The main memory 14 is also used for a working memory area of the microprocessor 13.

The image processing unit 15 includes a video RAM (VRAM), and renders, based on image data sent from the microprocessor 13, a game screen on the VRAM. The image processing unit 15 converts the game screen into video signals and outputs the video signals to the display unit 30 at predetermined times.

The audio processing unit 16 includes a sound buffer. The audio processing unit 16 reproduces audio data read from the optical disk 32 to the sound buffer, to thereby output various kinds of sound data (game music, game sound effect, message, and the like) from the audio outputting unit 31.

The optical disk drive 17 reads the program or data recorded on the optical disk 32 in accordance with an instruction given from the microprocessor 13. In this embodiment, the optical disk 32 is used for supplying the program or data to the home-use game machine 11, but any other information storage media such as the memory card 33 may also be used. Further, the program or data may also be supplied to the home-use game machine 11 from a remote location via a data communication network such as the Internet.

The memory card slot 18 is an interface for mounting of the memory card 33. The memory card 33 includes a nonvolatile memory (for example, EEPROM), and stores various kinds of game data such as saved data.

The communication interface 19 is an interface for communicative connection to a data communication network such as the Internet.

The controller interface 20 is an interface for allowing a plurality of controllers 22 to perform wireless connection. As the controller interface 20, it is possible to use, for example, an interface conforming to the Bluetooth (registered trademark) interface standard. It should be noted that the controller interface 20 may be an interface for allowing the controller 22 to perform wired connection.

The operation inputting unit 21 is used for allowing a user to perform an operation input. The operation inputting unit 21 has a function as, for example, a pointing device for allowing the user to point to a position on the game screen displayed on the display unit 30. As the operation inputting unit 21, it is possible to use, for example, technology disclosed in JP 3262677 B.

It should be noted that as the operation inputting unit 21, there may be used various kinds of publicly-known pointing devices which are capable of inputting, to the microprocessor 13, position data regarding a position specified by the user and predetermined signals corresponding to various kinds of buttons, and the operation inputting unit 21 is not limited thereto. For example, the operation inputting unit 21 may be a joystick, a mouse, or the like, which is connected by wireless via the controller interface 20.

Figure 2:
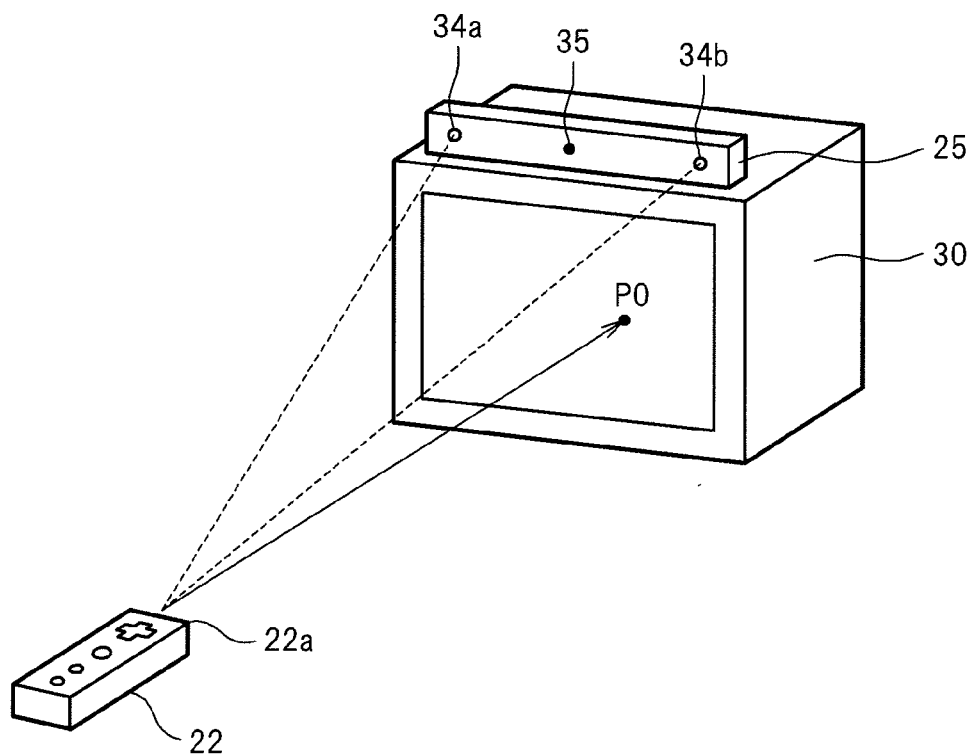
FIG. 2 is a diagram illustrating an example of an operation inputting unit.

The operation inputting unit 21 includes the controller 22 and a light emitting section 25. FIG. 2 is a diagram illustrating an example of the operation inputting unit 21. As illustrated in FIG. 2, the light emitting section 25 includes a plurality of light sources and is disposed on top of the display unit 30. In the example illustrated in FIG. 2, the light emitting section 25 is provided with light sources 34a and 34b on both end portions thereof. It should be noted that the light emitting section 25 may be disposed under the display unit 30.

Figure 3:
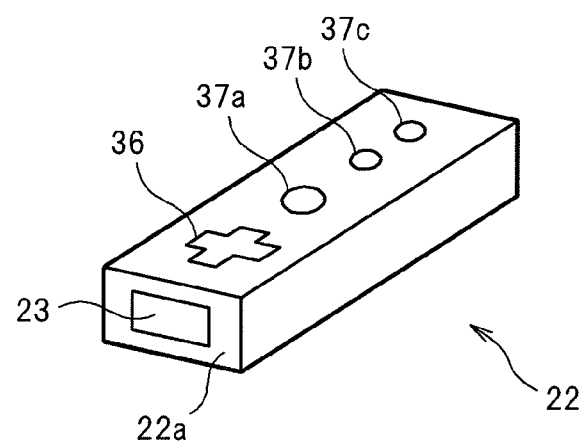
FIG. 3 is a diagram illustrating an example of a controller.

FIG. 3 is a diagram illustrating an example of the controller 22. As illustrated in FIG. 3, the controller 22 includes a direction button 36 and buttons 37a, 37b, and 37c. The direction button 36 has a cross shape, and is mainly used for a direction instruction operation. The buttons 37a, 37b, and 37c are mainly used for various kinds of game operations.

Further, as illustrated in FIG. 1, the controller 22 includes an image capturing unit 23 and a captured image analyzing unit 24. The image capturing unit 23 is, for example, an image capturing element, such as a charge coupled device (CCD), and is provided to a front end portion 22a of the controller 22. The captured image analyzing unit 24 is, for example, a microprocessor, and is built into the controller 22.

When the user aims the front end portion 22a of the controller 22 at the display unit 30, the light sources 34a and 34b are shown in an image captured by the image capturing unit 23. The captured image analyzing unit 24 analyzes the positions of the light sources 34a and 34b shown in the image captured by the image capturing unit 23, and acquires a position and an inclination of the controller 22 based on the analysis results. For example, the captured image analyzing unit 24 calculates a relative position of the controller 22 relative to a predetermined reference position 35 included in the light emitting section 25 and an inclination angle of the controller 22 relative to a straight line that connects the light sources 34a and 34b.

The game device 10 stores in advance, in a ROM (not shown), information related to a positional relationship between the reference position 35 and the game screen displayed on the display unit 30. Based on the information of the position and the inclination of the controller 22 acquired by the captured image analyzing unit 24, the game device 10 acquires screen coordinate values (coordinate values of a screen coordinate system) of a position P0 pointed to by the front end portion 22a of the controller 22.

It should be noted that the information indicating the position and the inclination of the controller 22 acquired by the captured image analyzing unit 24, that is, information for identifying the screen coordinate values of the position P0 pointed to by the front end portion 22a of the controller 22 is referred to as "pointing information".

Further, the controller 22 may include a vibrator (not shown). When a predetermined signal is input to the controller 22, the vibrator is caused to vibrate.

An operation signal indicating an operation state of the controller 22 is transmitted in every constant cycle (for example, 1/60 of a second) from the controller 22 to the microprocessor 13 via the controller interface 20. The operation signal includes, for example, the above-mentioned pointing information and information indicating a depression state of each button.

Based on the operation signal supplied from the controller 22, the microprocessor 13 specifies the position P0 pointed to by the front end portion 22a of the controller 22 or determines whether or not the direction button 36 or the button 37a, 37b, or 37c is depressed on the controller 22.

1-2. Game Executed by Game Device

On the game device 10 described above, for example, a soccer game simulating a soccer match is executed between a user's operation subject team and an opponent team. The soccer game is realized by the microprocessor 13 executing a program read from the optical disk 32.

Figure 4:
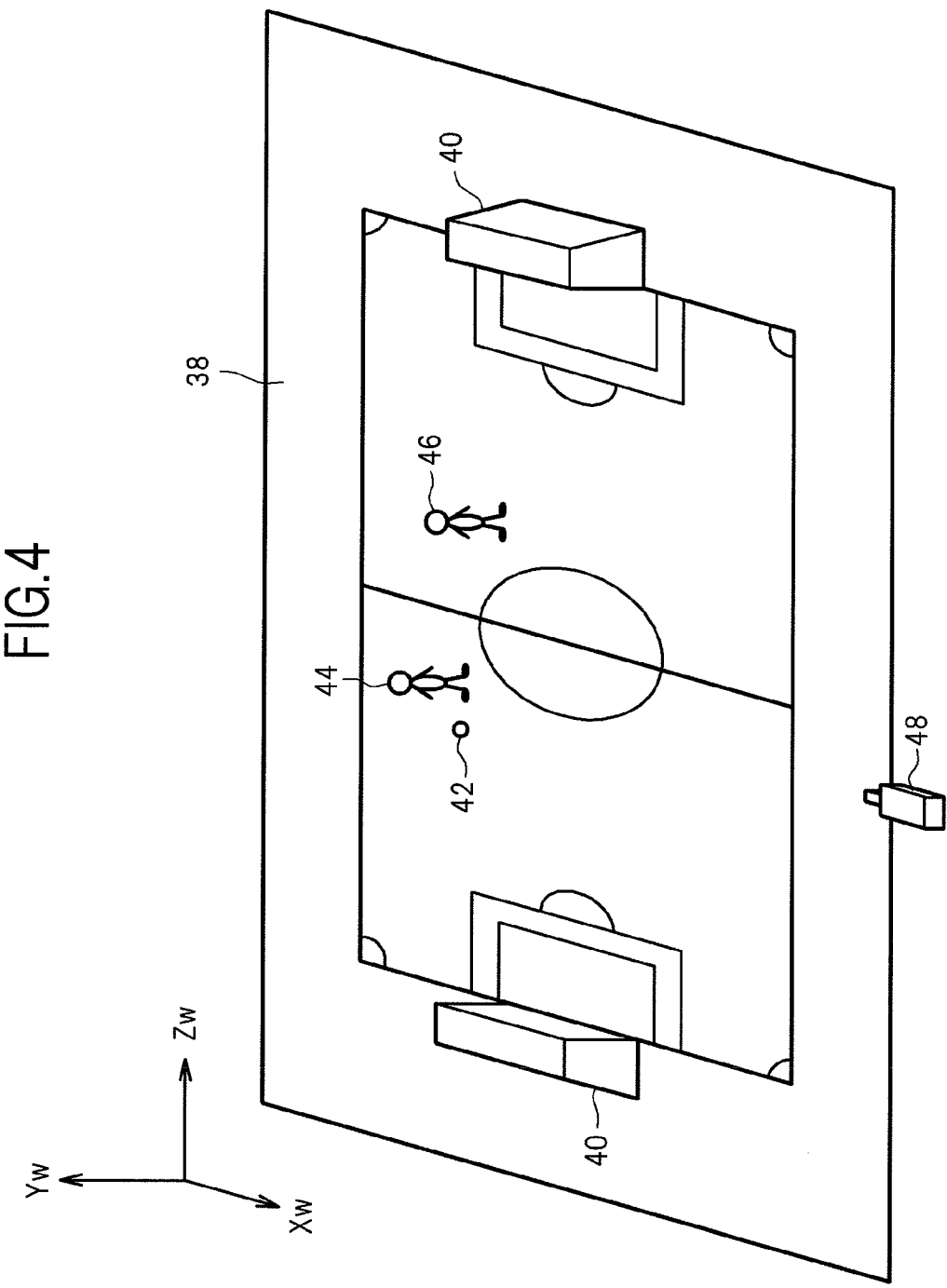
FIG. 4 is a diagram illustrating an example of a virtual three-dimensional space.

A virtual three-dimensional space is built in the main memory 14 of the game device 10. FIG. 4 illustrates an example of the virtual three-dimensional space. As illustrated in FIG. 4, in the virtual three-dimensional space, an Xw-axis, a Yw-axis, and a Zw-axis, which are orthogonal to one another, are set. A position within the virtual three-dimensional space is identified by world coordinate values of those coordinate axes (coordinate values of the world coordinate system). Further, a field object 38 representing a soccer field is disposed in the virtual three-dimensional space. The field object 38 is disposed parallel to a Xw-Zw plane, for example.

On the field object 38, the following objects are disposed:
(1) a ball object 42 representing a soccer ball (moving object);
(2) two goal objects 40;
(3) eleven player objects 44 belonging to the operation subject team; and
(4) eleven player objects 46 belonging to the opponent team.

The ball object 42 moves within the virtual three-dimensional space. In the virtual three-dimensional space, a virtual camera 48 (viewpoint) is set. A game screen showing a situation of the virtual three-dimensional space, which is viewed from the virtual camera 48, is displayed on the display unit 30. For example, in order to constantly display the ball object 42 on the game screen, the virtual camera 48 moves around within the virtual three-dimensional space according to the position of the ball object 42.

If a player object 44 or a player object 46 commits a foul which results in a free kick, the game screen is switched, and a game screen for the free kick is displayed on the display unit 30. Various kinds of publicly-known methods are applicable as a method of making a judgment about the foul during a game, which is used by the microprocessor 13. For example, if the ball object 42 hits part of the arm of the player object 44 (a so-called "hand-ball"), the microprocessor 13 judges that a foul which results in a free kick has occurred. If the microprocessor 13 judges that a foul results in a free kick, a free kick is performed from a predetermined position.

Figure 5:
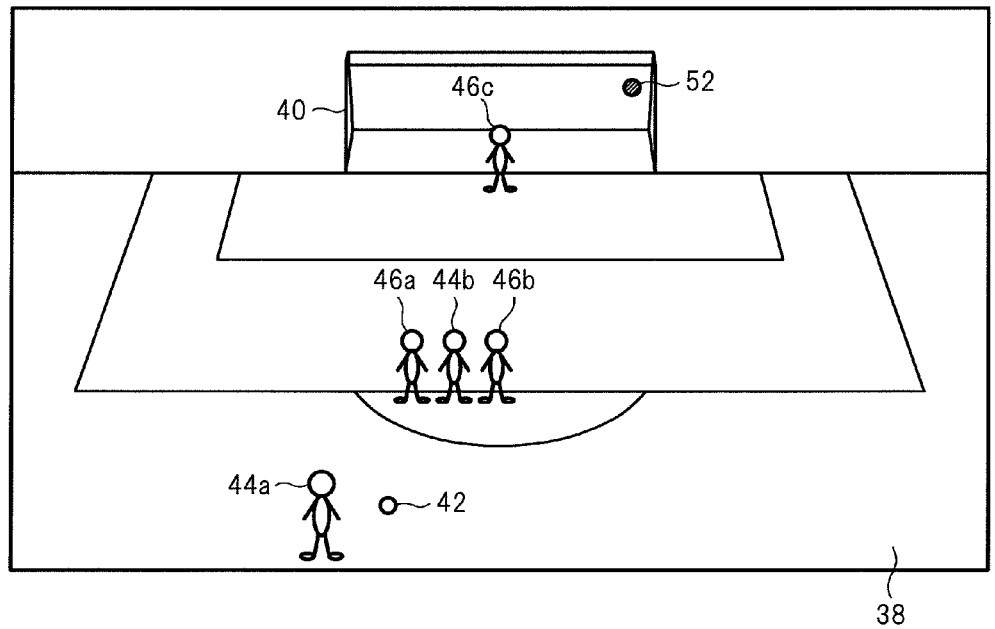
FIG. 5 is a diagram illustrating an example of a game screen.

FIG. 5 illustrates an example of the game screen which is displayed on the display unit 30 for a free kick. In the example illustrated in FIG. 5, the game screen includes the goal object 40, the ball object 42, two player objects 44a and 44b belonging to the user's operation subject team, and three player objects 46a, 46b, and 46c belonging to the opponent team.

According to this embodiment, in the game screen for a free kick, the virtual camera 48 moves to the back side of the player object 44a which is a kicker of the free kick. Hereinafter, a player who is a kicker of a free kick is referred to as an operation subject player. In the example of FIG. 5, the operation subject player is the player object 44a. The operation subject player may be changed through an input from the controller 22.

It should be noted that if a foul which results in a free kick has occurred, the virtual camera 48 may always be moved to the back side of the operation subject player, or may be moved to the back side of the operation subject player only when a foul has occurred at a given distance or less from the goal object 40. Specifically, in the case of a free kick caused by a foul which has occurred at a position where the operation subject player is unlikely to aim a shot at the opponent's goal, the virtual camera 48 does not move to the back side of the operation subject player, and accordingly, the viewpoint does not need to be switched.

Further, a cursor 52 is displayed on the game screen. The cursor 52 is displayed on the game screen based on a position specified by the user via the controller 22. The cursor 52 indicates a direction in which the ball object 42 should be traveling. In other words, the cursor 52 indicates a spot at which the operation subject player is aiming a shot.

As described above, the microprocessor 13 receives, via the controller interface 20, an operation signal indicating an operation state of the controller 22 every constant cycle. Based on the operation signal, the microprocessor 13 updates the display of the cursor 52 and the game screen which are to be displayed on the display unit 30 every constant cycle. The game screens to be displayed on the display unit 30 every constant cycle (for example, 1/60 of a second) are each referred to as a frame.

Hereinafter, detailed description is given of an operation for causing the operation subject player to make a shot in the game screen illustrated in FIG. 5.

First, the user operates the controller 22 to put the cursor 52 at a position where the user wants the operation subject player to aim a shot, for example, within a frame of the goal object 40. Next, the user depresses a button of the controller 22, which indicates a shot instruction (for example, button 37a). If a signal indicating the shot instruction (first input) is input via the controller interface 20, the microprocessor 13 causes the operation subject player to start an approach run (a preparation action).

On this occasion, through processing described later, an initial position and an initial direction of the ball object when the ball object 42 starts to move are acquired. For example, the initial position is represented by a position coordinate P1 of the ball object 42 which is stored in game situation data described later, whereas the initial direction is represented by a direction obtained by connecting the position coordinate P1 and a position coordinate of the world coordinate system which corresponds to the pointing information (hereinafter, referred to as a pointing position coordinate P2). The pointing position coordinate P2 is acquired through performing predetermined coordinate conversion processing based on the pointing information.

When the operation subject player kicks the ball object 42, the movement of the ball object 42 starts. For example, if a part of the foot of the operation subject player hits the ball object 42, the ball object 42 starts to move. Hereinafter, with respect to the moving direction of the ball object 42, a horizontal direction represented by the Xw-Zw plane is referred to as a horizontal moving direction, whereas a vertical direction represented by a Yw-Zw plane is referred to as a vertical moving direction.

When a button indicating the shot instruction is depressed with a button indicating an instruction for a knuckle shot (for example, the button 37b) being depressed, the microprocessor 13 causes the ball object 42 to move such that the ball object 42 unpredictably swerves and/or dips through processing described later. Specifically, if the instruction for a knuckle shot is input, the microprocessor 13 changes the moving direction of the ball object 42 a plurality of times to a moving direction determined based on an original moving direction and a random number.

Further, in a case where a button indicating an instruction to deliver a pass (for example, the button 37c) is depressed without making a shot, the microprocessor 13 may cause the operation subject player to deliver a pass to the pointing position coordinate P2 corresponding to the cursor 52 (for example, within a penalty area of the field object 38) as well.

1-3. Functions to be Implemented on the Game Device

Figure 6:
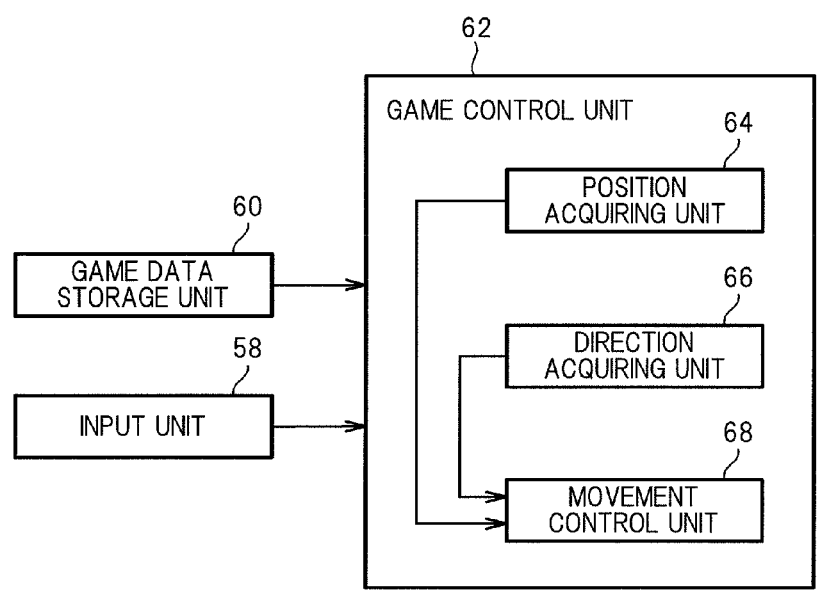
FIG. 6 is a functional block diagram illustrating a group of functions to be implemented on a game device according to a first embodiment.

FIG. 6 is a functional block diagram illustrating a group of functions to be implemented on the game device 10. As illustrated in FIG. 6, an input unit 58, a game data storage unit 60, and a game control unit 62 are implemented on the game device 10. Those functions are implemented by the microprocessor 13 operating according to programs read from the optical disk 32.

[1-3-1. Input Unit]

The input unit 58 is implemented mainly by the controller 22. The input unit 58 inputs the pointing information to the game control unit 62.

[1-3-2. Game Data Storage Unit]

The game data storage unit 60 is implemented mainly by the main memory 14 and the optical disk 32. The game data storage unit 60 stores various kinds of data necessary for the soccer game. In the case of this embodiment, the game data storage unit 60 stores game situation data and player parameter data.

The game situation data is stored in the main memory 14. The game situation data is data indicating a current situation of the virtual three-dimensional space. In other words, the virtual three-dimensional space illustrated in FIG. 4 is built in the main memory 14 based on the game situation data.

The game situation data contains data indicating the position coordinate in the virtual three-dimensional space, the moving direction, and the moving speed which are associated with the ball object 42, data indicating a change history of the moving direction of the ball object 42, to which the moving direction changed through processing described later is added, data indicating a virtual wind direction over the field object 38, data for identifying the operation subject player, data on the position coordinate corresponding to the player objects 44 and the player objects 46 on the field object 38, and the like. In addition, the game situation data may also contain data indicating scores, the remaining time, and the like, and data indicating the position coordinate and the moving direction of the ball object 42 in a past frame.

The player parameter data is stored in the optical disk 32. The player parameter data is data regarding the player objects 44 and the player objects 46, which indicate ability values and individual set values, such as right-footed or left-footed. In this embodiment, the player object 44 or the player object 46 whose player parameter data satisfies a predetermined condition are capable of kicking a knuckle shot in a free kick.

[1-3-3. Game Control Unit]

The game control unit 62 is implemented mainly by, for example, the microprocessor 13. The game control unit 62 includes, as functions relevant to the present invention, a position acquiring unit 64, a direction acquiring unit 66, and a movement control unit 68.

[Position Acquiring Unit]

The position acquiring unit 64 acquires the initial position of the ball object 42 when the ball object 42 starts to move in a free kick based on values stored in the game situation data. In this embodiment, the position coordinate P1 of the ball object 42 which are stored in the game situation data are used as the initial position. In other words, the position acquiring unit 64 acquires information regarding the position at which the ball is located at the time of the free kick.

[Direction Acquiring Unit]

The direction acquiring unit 66 acquires the initial direction of the ball object 42 when the ball object 42 starts to move in the virtual three-dimensional space. The direction acquiring unit 66 acquires the initial direction based on the pointing information which is input from the input unit 58. In this embodiment, the direction obtained by connecting the pointing position coordinate P2 corresponding to the cursor 52 and the position coordinate P1 is set as the initial direction. In other words, the direction acquiring unit 66 acquires information regarding a direction in which the operation subject player is aiming a shot. It should be noted that the initial direction may be displaced from the above-mentioned direction depending on an ability value of the operation subject player, such as kick accuracy.

[Movement Control Unit]

The movement control unit 68 (control means) causes the ball object 42 to start to move based on the initial position acquired by the position acquiring unit 64 and the initial direction acquired by the direction acquiring unit 66, to thereby move the ball object 42. Further, the movement control unit 68 (change means) changes the moving direction of the ball object 42 a plurality of times to the moving direction determined based on the original moving direction and the random number through processing described later.

In this embodiment, the movement control unit 68 (determination means) determines the moving direction of the ball object 42 for every predetermined number of frames based on the original moving direction and the random number. Here, the movement control unit 68 only needs to change the moving direction of the ball object 42 a plurality of times to the moving direction determined through a predetermined method based on the original moving direction and the random number, and the method of determining the moving direction is not limited thereto. For example, instead of changing the moving direction for every predetermined number of frames, the movement control unit 68 may change the moving direction of the ball object 42 a plurality of times to the moving direction determined in the above-mentioned method for each predetermined distance by which the ball object 42 has moved, or each time the user depresses the button 37a or the like.

1-4. Processing to be Executed on the Game Device

Figure 7:
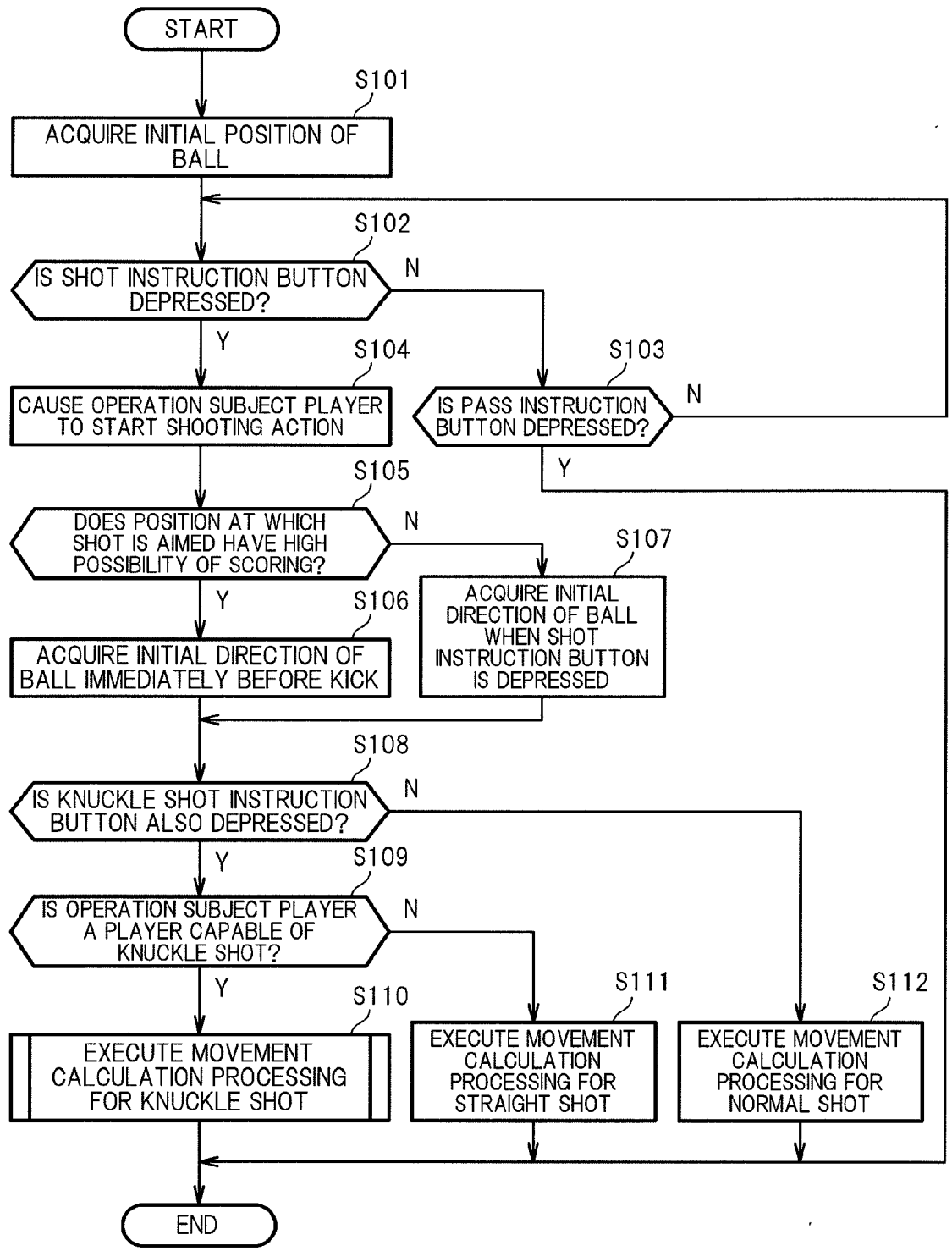
FIG. 7 is a flow chart illustrating an example of processing to be executed on the game device.
Figure 8:
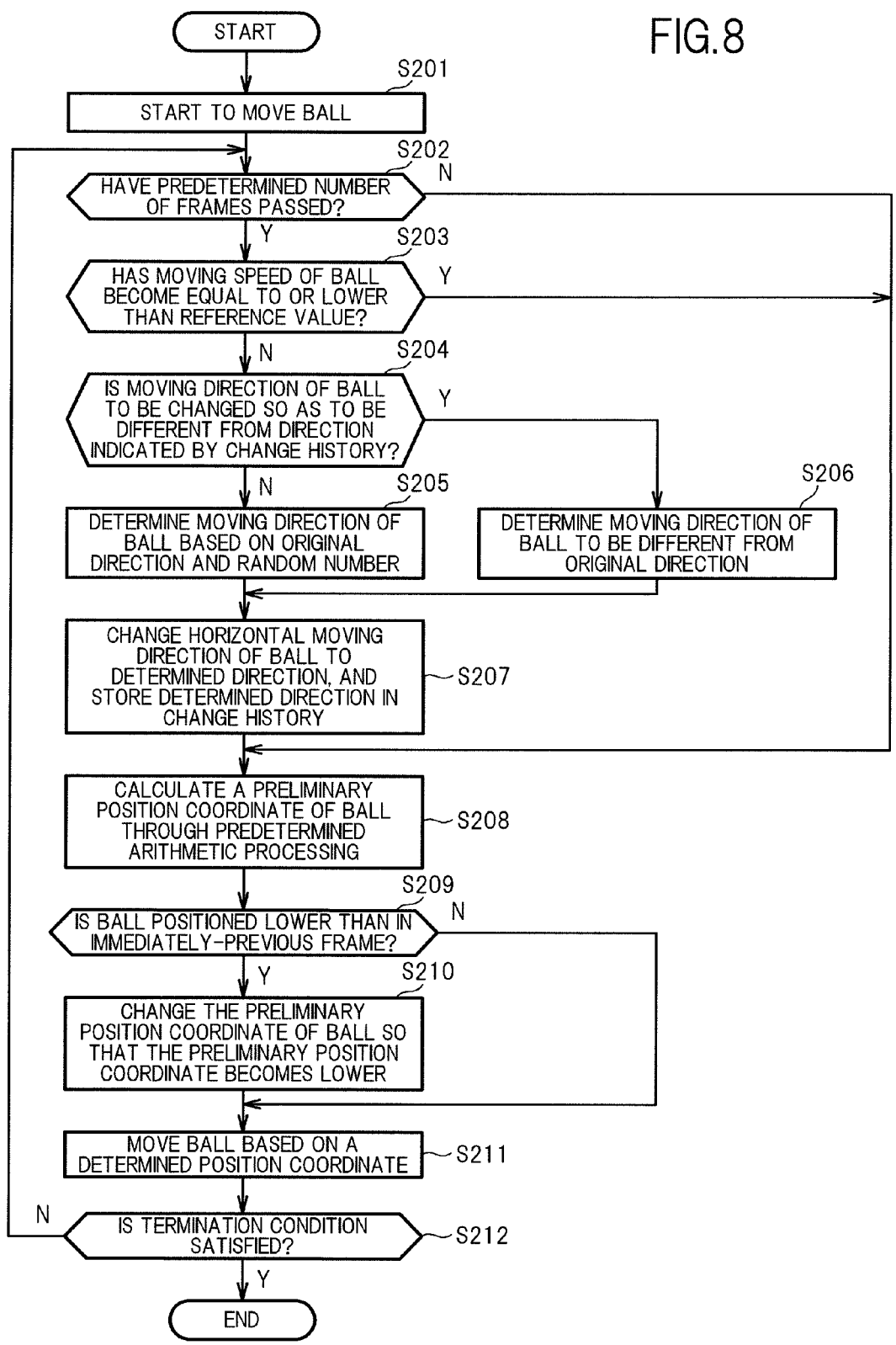
FIG. 8 is a flow chart illustrating an example of processing to be executed on the game device.

FIG. 7 and FIG. 8 are flow charts illustrating an example of processing to be executed on the game device 10. The processing of each of FIG. 7 and FIG. 8 is executed by the microprocessor 13 operating according to programs.

First, description is given of the processing illustrated in FIG. 7. The processing illustrated in FIG. 7 is processing to be executed when the game screen for a free kick (FIG. 5) is displayed on the display unit 30.

As illustrated in FIG. 7, the microprocessor 13 (the position acquiring unit 64) acquires the initial position of the ball object (S101). The microprocessor 13 judges whether or not a shot instruction button of the controller 22 is depressed (S102). If the shot instruction button is not depressed (N in S102), the microprocessor 13 judges whether or not a pass instruction button of the controller 22 is depressed (S103).

If the pass instruction button is not depressed (N in S103), the processing returns to S102, in which the microprocessor 13 judges whether or not the shot instruction button of the controller 22 is depressed. If the pass instruction button is depressed (Y in S103), the microprocessor 13 terminates the processing.

On the other hand, if the shot instruction button is depressed (Y in S102), the microprocessor 13 causes the operation subject player to start a shooting action (S104). In S104, the operation subject player starts the approach run toward the ball object 42. When the operation subject player reaches the vicinity of the ball object 42, the operation subject player performs a kicking action.

The microprocessor 13 judges whether or not the position at which the operation subject player is aiming the shot is a position having a high possibility of scoring (S105). Specifically, the microprocessor 13 judges whether or not there is a high possibility of scoring based on the pointing position coordinate P2 corresponding to the position of the cursor 52 which is specified by the user via the controller 22.

In S105, it is judged that the possibility of scoring is high if the cursor 52 is located in an upper corner region or a lower corner region of the goal object 40, in a case where the cursor 52 is located in a region which is distanced from the player object 46 playing the goalkeeper, and in other similar cases. On the other hand, it is judged that the possibility of scoring is low in a case where the cursor 52 is displayed in a region in front of the player object 46 playing the goalkeeper or in another similar region. Those regions are set in advance. It should be noted that for an operation subject player having a high ability value in the player parameter data, a region to be judged to have a high possibility of scoring may be enlarged.

If the possibility of scoring is high (Y in S105), the microprocessor 13 (the direction acquiring unit 66) acquires the initial direction of the ball object 42 at a time immediately before the operation subject player kicks the ball object 42 (S106). In S106, the microprocessor 13 acquires the pointing position coordinate P2 in a frame judged to be immediately before the operation subject player kicks the ball object 42. For example, this frame is a frame of when the region of the operation subject player has entered a range of a predetermined distance from the position coordinate P1 of the ball object 42.

On the other hand, if the possibility of scoring is not high (N in S105), the microprocessor 13 (the direction acquiring unit 66) acquires the initial direction of the ball object 42 at a time at which the shot instruction button is depressed (S107). The pointing position coordinate P2 at this time is stored in the main memory 14.

As in the cases of S106 and S107, depending on a predetermined condition, times at which the initial directions are acquired are made different from each other. As a result, it is possible to make the user's target more likely to be missed, or to allow the user to obtain the intended shot course.

Next, the microprocessor 13 judges whether or not a knuckle shot instruction button of the controller 22 is also depressed when the shot instruction button is depressed (S108).

If the knuckle shot instruction button is also depressed (Y in S108), the microprocessor 13 judges whether or not the operation subject player is a player capable of a knuckle shot (S109). In S109, as described above, the microprocessor 13 refers to the ability value in the player parameter data which is associated with the operation subject player, to thereby judge whether or not the operation subject player is a player whose ability value is equal to or higher than a predetermined threshold. It should be noted that the judgment method of S109 is not limited thereto, and another parameter or the like which is stored in the game situation data or the player parameter data may be used for the judgment.

If the operation subject player is a player capable of a knuckle shot (Y in S109), the microprocessor 13 (the movement control unit 68) executes movement calculation processing for the knuckle shot (S110).

The processing illustrated in FIG. 8 is movement processing for a knuckle shot, which is executed in S110 of FIG. 7. The processing described below is processing to be executed after the frame in which the operation subject player kicks the ball object 42.

First, a description is given of an outline of the processing illustrated in FIG. 8.

In the movement processing for a knuckle shot, the horizontal moving direction is determined, and a preliminary position coordinate of the ball object 42 is calculated through predetermined arithmetic processing. If the preliminary position coordinate is lower than in a previous frame, the control is performed so as to lower the position coordinate. Here, the phrase "to lower the position coordinate" means that a value of the position coordinate in the Yw-axis direction (vertical direction) is decreased. Specifically, if a value of the preliminary position coordinate in the Yw-axis direction is decreased compared to a value of the position coordinate of the ball object 42 in the Yw-axis direction in the previous frame, the control is performed so as to decrease the value of the preliminary position coordinate in the Yw-axis direction.

Figure 9:
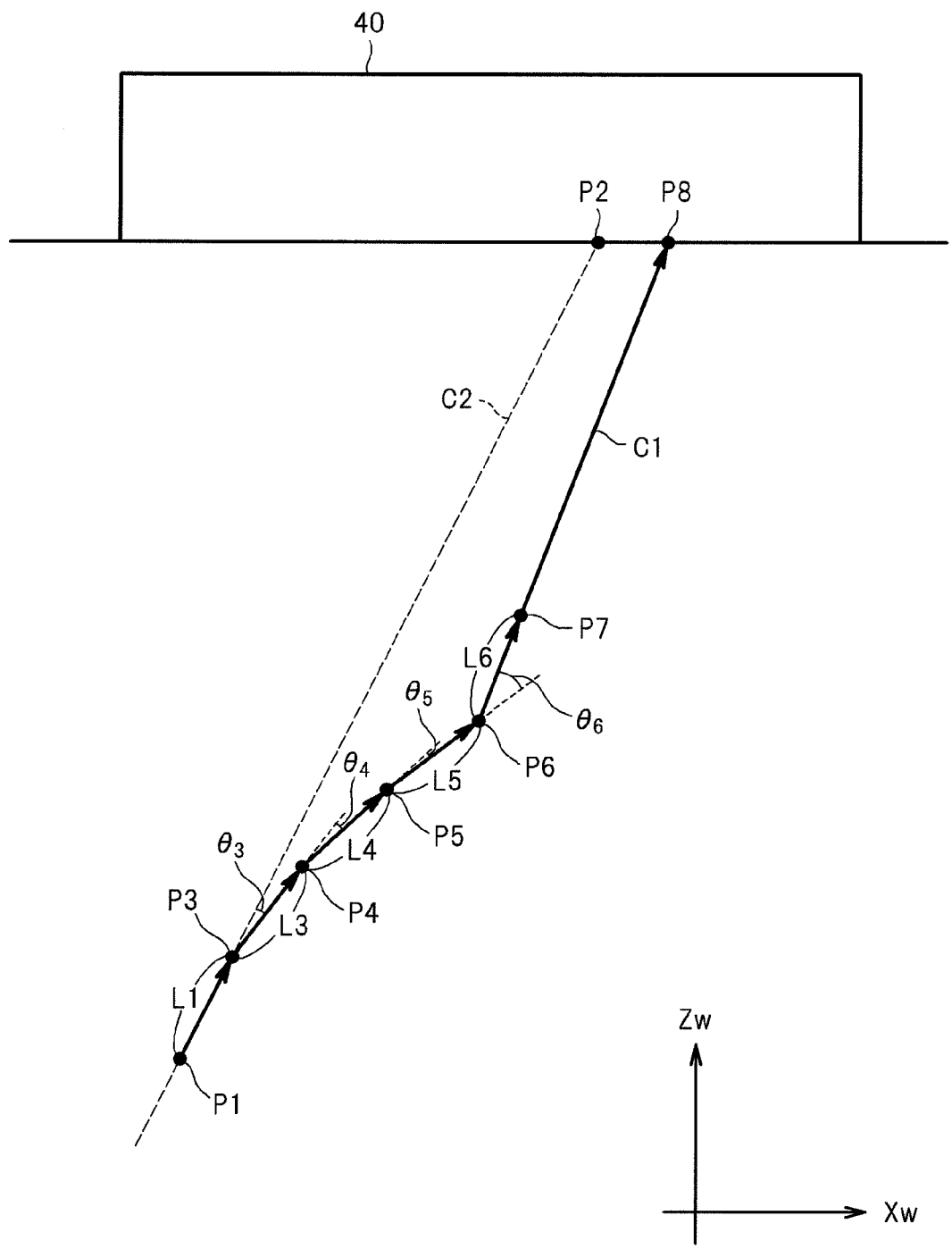
FIG. 9 is a schematic diagram illustrating how the ball object moves in a horizontal direction.

FIG. 9 is a schematic diagram illustrating a trajectory C1 of the ball object 42 in the horizontal direction in the case of the knuckle shot. As illustrated in FIG. 9, the horizontal moving direction is changed for every predetermined number of frames. If the speed of the ball object 42 has become equal to or lower than a reference value (the position coordinate P7 of FIG. 9), the determination of the moving direction based on the random number is restricted. Detailed description of FIG. 9 is given later.

Figure 10:
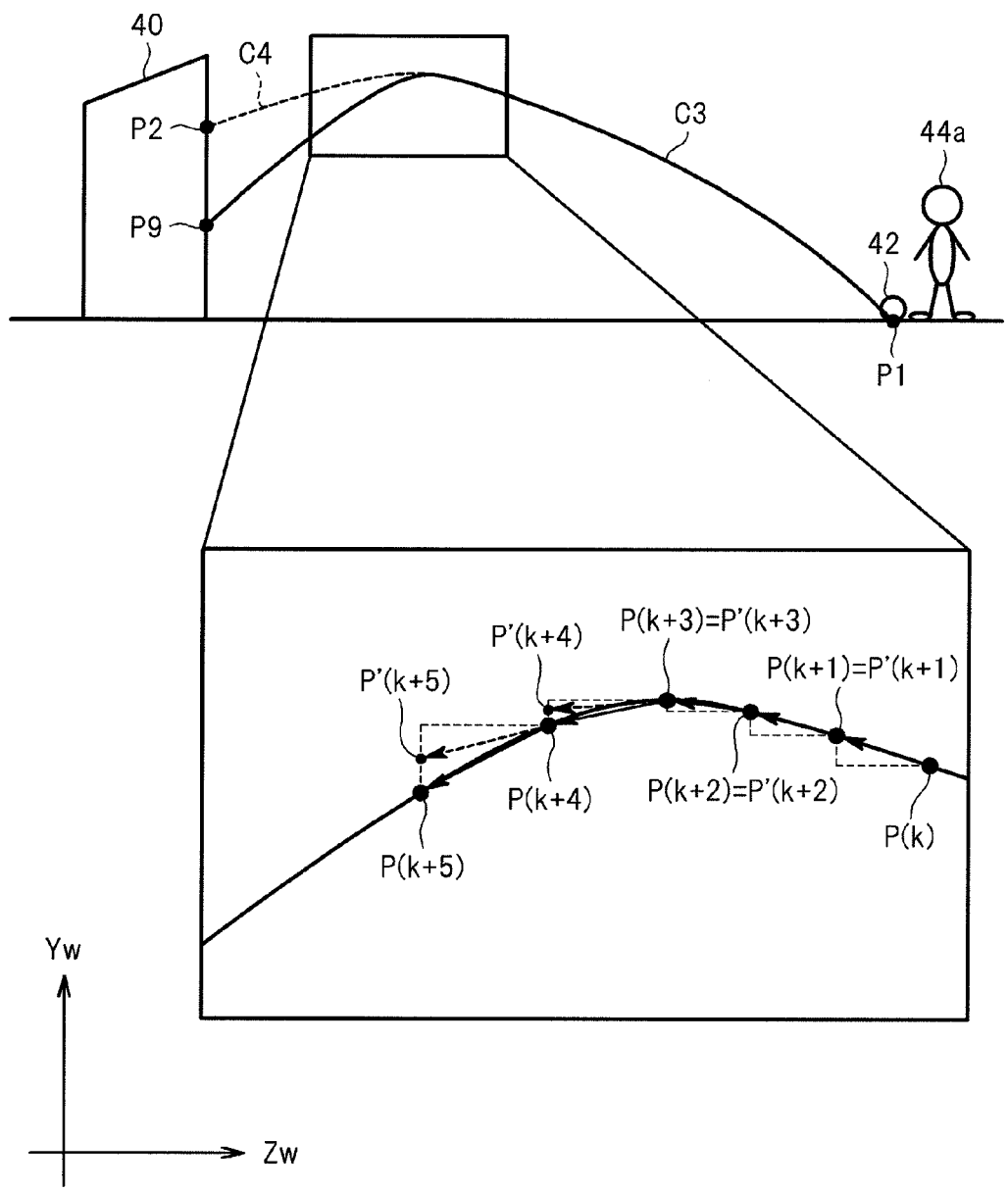
FIG. 10 is a schematic diagram illustrating how the ball object moves in a vertical direction.

FIG. 10 is a schematic diagram illustrating a trajectory C3 of the ball object 42 in the vertical direction in the case of the knuckle shot. As illustrated in FIG. 10, the preliminary position coordinate is calculated for each frame, and if the preliminary coordinate is lower than the position coordinate in the previous frame (P'(k+4) of FIG. 10, for example), the control is performed so as to lower the position coordinate. Detailed description of FIG. 10 is given later.

Next, a detailed description is given of the processing illustrated in FIG. 8.

As illustrated in FIG. 8, the microprocessor 13 causes the ball object 42 to start to move (S201). Specifically, the microprocessor 13 uses the initial position acquired in S101 as a starting point, and calculates the position coordinate which is apart from the initial position by a distance corresponding to an initial speed of the ball in the initial direction acquired in S106 or S107. The initial speed of the ball is calculated based on the player parameter data, a period of time during which the shot instruction button is depressed, or the like.

In S201, the microprocessor 13 updates the game situation data to move the ball object 42 to the calculated position coordinate. Specifically, in a frame subsequent to the frame in which the operation subject player kicks the ball, the ball object 42 is displayed at this position coordinate.

Next, the microprocessor 13 judges whether or not a predetermined number of frames, which are set for changing the moving direction of the ball object 42, have passed (S202). As the predetermined number of frames, a value set in advance, such as three frames or ten frames, may be used. Alternatively, a value set according to the player parameter data of the operation subject player may be used. For example, in a case where the ability of the operation subject player is low, ten frames is set, whereas in a case where the ability of the operation subject player is high, three frames or so is set. As a result, in the case of a player with a high ability, the trajectory of the ball object 42 can be deflected more finely and randomly.

If the predetermined number of frames have passed (Y in S202), the microprocessor 13 judges whether or not the moving speed of the ball object 42, which is stored in the game situation data, has become equal to or lower than the reference value (S203). The microprocessor 13 subtracts, from the initial speed of the ball object 42, a value corresponding to a distance by which the ball object 42 has moved, and then updates the game situation data.

It should be noted that the calculation method for the moving speed of the ball object 42 is not limited thereto as long as a determination is made based on the game situation data or the player parameter data. For example, if the data of the game situation data which represents the wind speed indicates a tail wind relative to the moving direction of the ball object 42, the calculation may be made by adding a predetermined value corresponding to the wind speed to the moving speed of the ball object 42.

If the moving speed of the ball object 42 is not equal to or lower than the reference value (N in S203), the microprocessor 13 judges, based on the change history stored in the game data storage unit 60, whether or not the moving direction of the ball object 42 is to be changed so as to be different from a direction indicated by the change history (S204).

FIG. 11 is a diagram illustrating a data storage example of the change history. As illustrated in FIG. 11, the change history stores the moving direction of the ball object 42, which is changed in S205 or S206 described later.

The example of FIG. 11 shows that when ten frames have passed after the operation subject player kicks the ball object 42, the original moving direction is changed to a direction obtained by rotating the original moving direction clockwise by 3° in the Xw-Zw plane. This change is regarded as a first change. Similarly, the example of FIG. 11 shows that when twenty frames have passed, the moving direction is changed to a direction obtained by rotating the moving direction by 4° (second change), and when thirty frames have passed, the moving direction is changed to a direction obtained by rotating the moving direction by 2° (third change).

In S204, for example, if the change history indicates that the moving direction of the ball object 42 has been changed to the same direction a predetermined number of times, or if the change history indicates that the previous change has been larger than a predetermined change, it is judged that the moving direction is to be changed so as to be different from the direction indicated by the change history.

If the moving direction is not changed so as to be different from the direction indicated by the change history (N in S204), the microprocessor 13 (the movement control unit 68 as determination means) determines the moving direction of the ball object 42 based on the original moving direction and the random number (S205).

The original moving direction refers to a moving direction of the ball object 42 between a frame displayed on the display unit 30 when the processing of S205 is executed and the previous frame. As the random number, there is used a random number R generated based on a time function or the like when the processing of S205 is executed. For example, in S205, the microprocessor 13 determines the moving direction to be a direction obtained by rotating the original moving direction clockwise by an angle θ (from −9° to 9°) which is determined based on a sign and a value of the last digit of the random number R.

If the moving direction is changed so as to be different from the direction indicated by the change history (Y in S204), the microprocessor 13 determines the moving direction of the ball object 42 to be different from the original horizontal moving direction (S206). For example, the moving direction is determined to be deflected in an opposite direction to a direction toward which the original horizontal moving direction is deflected from the initial direction. Specifically, if the original moving direction is deflected rightward when viewed from the operation subject player, the moving direction is determined to be deflected leftward.

The microprocessor 13 (the movement control unit 68 as change means) changes the horizontal moving direction of the ball object 42 to the direction determined in S205 or S206, and then stores the moving direction in the change history (S207). In this case, in S208 described later, the preliminary position coordinate is calculated based on the horizontal moving direction changed in S205 or S206.

On the other hand, if the predetermined number of frames have not passed (N in S202), or if the speed of the ball object 42 is equal to or lower than the reference value (Y in S203), the microprocessor 13 does not execute the processing of S204 to S207. In this case, in S208 described later, the preliminary position coordinate is calculated based on the horizontal moving direction in the previous frame.

Next, the microprocessor 13 performs predetermined arithmetic processing to calculate a position (the preliminary position coordinate) at which the ball object 42 is to be displayed in the next frame on the display unit 30 (S208). For example, based on the position coordinate of the ball object 42 in the past frames and a normal gravitational acceleration $g_1$ (for example, $g_1=9.8$ (m/s$^2$)) set in advance, the vertical moving direction is identified. Based on the vertical moving direction, the horizontal moving direction, and the moving speed, the preliminary position coordinate of the ball object 42 is calculated.

The preliminary position coordinate calculated in S208 is the position coordinate at which the ball object 42 is to be displayed in the next frame if the ball object 42 does not drop in a manner specific to the knuckle shot. It should be noted that in S208, the vertical moving direction may be identified based on the past moving direction or the like of the ball object 42, which is stored in the game situation data, to calculate the preliminary position coordinate.

Next, the microprocessor 13 judges whether or not the ball object 42 is positioned lower than in an immediately-previous frame (S209). Specifically, the microprocessor 13 judges whether or not the preliminary position coordinate calculated in S208 is lower than the position coordinate of the ball object 42, which is stored in the game situation data.

If the position coordinate of the ball object 42 is positioned lower than in the previous frame (Y in S209), the microprocessor 13 (the movement control unit 68 as vertical position changing means) performs control so that a vertical component of the preliminary position coordinate becomes lower (S210).

In S210, for example, the microprocessor 13 recalculates the preliminary position coordinate calculated in S208 based on a gravitational acceleration $g_2$ (for example, $g_2=19.6$ (m/s$^2$)), which is larger than the normal gravitational acceleration $g_1$. As the gravitational acceleration $g_2$, a value set in advance may be used. Alternatively, the gravitational acceleration $g_2$ may be determined randomly based on a random number generated at a time at which the shot instruction button is depressed or at another time.

It should be noted that in S210, the present invention is not limited thereto as long as the control is performed so as to lower the preliminary position coordinate calculated in S208. For example, a Yw-axis direction component of the preliminary position coordinate may be decreased by a predetermined value. The predetermined value may be set in advance, or may be determined to be an arbitrary value based on the random number. Due to the processing of S210, in subsequent frames after the ball object 42 starts to drop, it is possible to cause the ball object 42 to drop more significantly than the normal shot.

If the ball object 42 is positioned higher than in the previous frame (N in S209), the microprocessor 13 does not perform the processing of S210. Specifically, instead of the control for lowering the preliminary position coordinate, the movement processing for the ball object 42 is performed in S211, which is described later. It should be noted that the phrase "the ball object 42 is positioned higher than in the previous frame" means that the value of the position coordinate in the Yw-axis direction is increased. Specifically, if the value of the preliminary position coordinate in the Yw-axis direction is increased compared to a value of the position coordinate of the ball object 42 in the Yw-axis direction in the previous frame, it is judged in S209 that the ball object 42 is positioned higher than in the previous frame.

The microprocessor 13 moves the ball object 42 to the preliminary position coordinate calculated in S208 or the position coordinate determined through the control in S210 (S211). Specifically, the microprocessor 13 performs display processing for the next frame, and causes the ball object 42 to be displayed at the corresponding position. At the time of the display processing, the microprocessor 13 updates data or the like of the game situation data, which indicate the position coordinate, the moving direction, and the moving speed of the ball object 42.

The microprocessor 13 judges whether or not a termination condition is satisfied (S212). The termination condition is a condition used for terminating the movement calculation processing for a knuckle shot illustrated in FIG. 8. For example, the termination condition relates to whether or not the ball object 42 is included in a region of the goal object 40, for example.

If the termination condition is not satisfied (N in S212), the processing returns to S202, in which the microprocessor 13 performs the processing for the next frame. If the termination condition is satisfied (Y in S212), the microprocessor 13 terminates the processing.

Next, detailed description is given of how the ball object 42 moves due to the processing illustrated in FIG. 8. First, the movement in the horizontal direction is described.

The trajectory C1 (solid line) illustrated in FIG. 9 is a line obtained by connecting the position coordinate of the ball object 42 in the respective frames through the movement processing for a knuckle shot, which is executed in S110. Further, as illustrated in FIG. 9, a line obtained by connecting the position coordinate P1 of the ball object 42 and the pointing position coordinate P2 is set as a trajectory C2 (broken line).

In S201, the microprocessor 13 causes the ball object 42 to start to move. For example, the microprocessor 13 moves the ball object 42, with the position coordinate P1 set as the starting point, by a predetermined distance in a horizontal direction obtained by connecting the position coordinate P1 and the pointing position coordinate P2 (that is, initial direction).

In a case where the number of frames to be used for the judgment of S202 is set to n (n is a natural number), the microprocessor 13 moves the ball object 42 for n frames in the same horizontal direction according to the moving speed of the ball object 42. The position coordinate of the ball object 42 which has been moved for the n frames is set as a position coordinate P3. A horizontal distance L1 between the position coordinate P1 and the position coordinate P3 is a distance by which the ball object 42 has moved in the horizontal direction for the n frames.

Next, through the processing of S205, the moving direction in the next frame is determined based on the original moving direction and the random number. For example, in S205, the microprocessor 13 sets a direction obtained by connecting the position coordinate P1 and the position coordinate P3 as a reference direction, and determines, as the horizontal moving direction, a direction obtained by rotating the reference direction clockwise by an angle $\theta_3$ in the Xw-Zw plane.

The angle $\theta_3$ is determined randomly based on the random number. For example, the angle $\theta_3$ may be an arbitrary numerical value ranging from −9° to 9° as described above. Alternatively, the angle $\theta_3$ may be calculated with a predetermined calculation formula in which weighting is applied using, as a factor, the wind direction stored in the game situation data. The angle $\theta_3$ may be set so as to provide the same direction as the original direction (angle $\theta_3$ is 0°).

The microprocessor 13 moves the ball object 42 for n frames in the determined horizontal moving direction with the position coordinate P3 set as the starting point. The position coordinate of the ball object 42 which has been moved for the n frames is set as a position coordinate P4. A horizontal distance L3 between the position coordinate P3 and the position coordinate P4 is a distance by which the ball object 42 has moved in the horizontal direction for the n frames.

The microprocessor 13 moves the ball object 42 through the same processing as described above until it is judged in S203 that the moving speed of the ball object 42 has become equal to or lower than the reference value, or until it is judged in S204 that the horizontal moving direction is to be changed to a direction different from the direction indicated by the change history.

In the example illustrated in FIG. 9, the position coordinate of the ball object 42 which is obtained after n frames from the position coordinate P4 is set as a position coordinate P5. For example, the microprocessor 13 sets a direction obtained by connecting the position coordinate P3 and the position coordinate P4 as a reference direction, and determines, as the moving direction, a direction obtained by rotating the reference direction clockwise by an angle $\theta_4$ in the Xw-Zw plane, to thereby change the horizontal moving direction.

Similarly, the position coordinate of the ball object 42 which is obtained after n frames from the position coordinate P5 is set as a position coordinate P6. For example, the microprocessor 13 sets a direction obtained by connecting the position coordinate P4 and the position coordinate P5 as a reference direction, and determines, as the horizontal moving direction, a direction obtained by rotating the reference direction clockwise by an angle $\theta_5$ in the Xw-Zw plane, to thereby change the horizontal moving direction. The example illustrated in FIG. 9 shows a case where the angle $\theta_4$ and the angle $\theta_5$ both take positive values.

If the microprocessor 13 judges in S204 that the horizontal moving direction is to be changed to a direction different from the direction indicated by the change history, the horizontal moving direction is changed to a direction different from the direction indicated by the change history. For example, if the change history indicates that the horizontal moving direction has been deflected to the same side three times in a row, the horizontal moving direction is changed to the opposite side.

While the ball object 42 moves from the position coordinate P3 to the position coordinate P6, all the three angles $\theta_3$ to $\theta_5$ take positive values, and hence, in S206, the moving direction is determined to be a different horizontal moving direction. For example, the microprocessor 13 determines an angle $\theta_6$ to be a negative value. In this manner, if an angle $\theta_7$ is calculated based on the past horizontal moving directions when a position coordinate P7 is determined, it is possible to prevent the knuckle shot from continuing to swerve in a given horizontal direction.

If the microprocessor 13 judges in S203 that the moving speed of the ball object 42 has become equal to or lower than the reference value, the processing of changing the moving direction in S205 or S206 is not performed. In the example illustrated in FIG. 9, if the ball object 42 has moved to the position at the position coordinate P7, it is judged that the moving speed is equal to or lower than the reference value. In the subsequent frames, the moving direction in the horizontal direction is restricted from being changed based on the original moving direction and the random number.

The microprocessor 13 causes the ball object 42 to move in a direction obtained by connecting the position coordinate P6 and the position coordinate P7. The microprocessor 13 sets a point at which a Zw-coordinate value of the pointing position coordinate P2 coincides with a Zw-coordinate value obtained when the ball object 42 is moved in that moving direction as a position coordinate P8 in the horizontal direction. In other words, the position coordinate P8 indicates a position in the horizontal direction where the ball object 42 passes through the goal object 40 after the operation subject player kicks a knuckle shot.

It should be noted that as to the horizontal direction in the subsequent frames, the horizontal moving direction only needs to be prevented from being changed through such a method as in S205 or S206, and does not necessarily need to be made in a fixed direction as described above. For example, based on the wind direction or the like of the game situation data, the horizontal moving direction may be changed within a predetermined range.

Further, in the example illustrated in FIG. 9, description has been given taking as an example the case where the termination condition used in S212 relates to whether or not the ball object 42 has entered the region of the goal object 40. However, the termination condition may relate to whether or not the ball object 42 has entered a region of the player object 46c playing the goalkeeper. The position coordinate of the ball object 42 in a frame corresponding to this case is the position coordinate P8.

Next, the movement in the vertical direction is described.

A trajectory C4 illustrated in FIG. 10 is a trajectory in the vertical direction which is calculated using the normal gravitational acceleration $g_1$ so that a parabola is formed between the position coordinate P1 of the ball object 42 and the pointing position coordinate P2.

Assuming that a frame in which the operation subject player kicks the ball object 42 is a 0-th frame, the position coordinate of the ball object 42 in a given subsequent frame (referred to as k-th frame) is referred to as a position coordinate P(k). In S208, a preliminary position coordinate P'(k+1) in the next frame ((k+1)-th frame), to which the ball object 42 is to be moved, is calculated based on the gravitational acceleration $g_1$. In the example of FIG. 10, the preliminary position coordinate P'(k+1) is positioned higher in the Yw-axis direction than the position coordinate P(k), and hence the control of S210 is not performed.

As illustrated in FIG. 10, for a (k+2)-th frame and a (k+3)-th frame, similarly, the control of S210 is not performed. Specifically, based on the preliminary position coordinate calculated based on the gravitational acceleration $g_1$ in S208, the movement processing for the ball object 42 is executed.

As in a (k+4)-th frame illustrated in FIG. 10, if a preliminary position coordinate P'(k+4) calculated based on the gravitational acceleration $g_1$ in S208 is positioned lower than a position coordinate P(k+3) in the previous frame, the control of S210 is performed. The position coordinate of the ball object 42 is controlled so as to be a position coordinate P(n+4), which is lower than the preliminary position coordinate P'(k+4).

With regard to a subsequent (k+5)-th frame, similarly, the control of S210 is performed. Specifically, the position coordinate of the ball object 42 is controlled so as to be a position coordinate P(k+5), which is lower than a preliminary position coordinate P'(k+5).

In this manner, by calculating the preliminary position coordinate and performing the control for each frame, the trajectory C3 in the vertical direction is determined. The coordinate of a point at which a Zw-coordinate value of the pointing position coordinate P2 and a Zw-coordinate value of the trajectory C3 coincide with each other is set as a position coordinate P9.

The position coordinate P9 indicates a position in the vertical direction if the ball object 42 passes through the goal object 40 after the operation subject player kicks a knuckle shot. As can be seen, when the operation subject player kicks a knuckle shot, for frames subsequent to the frame in which the ball object 42 starts to drop, a trajectory which drops more significantly in the vertical direction than a normal shot is calculated.

Referring back to FIG. 7, if the operation subject player is not a player capable of a knuckle shot (N in S109), the microprocessor 13 executes the movement processing for a straight shot (S111). Specifically, based on the position coordinate P1 of the ball object 42 and the pointing position coordinate P2, the ball object 42 moves so as to form a trajectory of a straight shot.

In S111, for example, the trajectory of the straight shot in the vertical direction, along which the ball object 42 moves, is the trajectory C4 described with reference to FIG. 10. The trajectory of the straight shot in the horizontal direction is a straight line connecting the position coordinate P1 of the ball object 42 and the pointing position coordinate P2 (trajectory C2 of FIG. 9).

On the other hand, if the knuckle shot instruction button is not depressed (N in S108), the microprocessor 13 executes movement calculation processing for a normal shot (S112). Specifically, based on the position coordinate P1 of the ball object 42, the pointing position coordinate P2, and an input from the controller 22, the ball object 42 moves so as to form a trajectory of a normal shot.

In S112, for example, the trajectory of the normal shot in the vertical direction, along which the ball object 42 moves, is such a trajectory that curves according to an amount by which the user has turned the controller 22 in a given direction. Similarly, the trajectory of the normal shot in the horizontal direction is such a trajectory that forms an arc connecting, with a given curvature, the position coordinate P1 of the ball object 42 and the pointing position coordinate P2.

1-5. Summary of First Embodiment

In the game device 10 according to the first embodiment described above, the moving direction of the ball object 42 is changed a plurality of times to the moving direction determined based on the original moving direction and the random number. With the game device 10 according to the first embodiment, it is possible to show a situation in which a moving object substantially in a non-spinning state forms an unpredictable trajectory, unlike the normal shot, the straight shot, or the like, while achieving reduction in processing load without performing a physical simulation. In other words, it is possible to allow the user to feel as if the user is operating a highly-skilled star player.

Further, if the moving speed of the ball object 42 has become equal to or lower than the reference value, in frames subsequent to the frame of this moment, the moving direction is restricted from being changed based on the original moving direction of the ball object 42 and the random number. Like a knuckle shot kicked by a real player, a shot which unpredictably swerves and/or dips while the moving speed of the ball is high and does not swerve or dip after the moving speed has decreased to a certain extent can be realized in a game.

Further, after the ball object 42 starts to drop, the trajectory thereof is formed so as to drop significantly. Like a knuckle shot kicked by a real player, such a shot that drops significantly in the vertical direction after the ball starts to drop can be realized.

Further, when the ball object 42 moves in the virtual three-dimensional space, the moving direction is determined based on the change history of the moving directions changed in the past. Thus, it is possible to prevent the user from making an unintended shot, such as a shot which continues to swerve in a given direction and goes wide of the goal object 40.

It should be noted that the present invention is not limited to the embodiment described above, and various modifications and changes may be made without departing from the spirit and scope of the present invention. For example, in this embodiment, the description has been given taking the home-use game machine as an example, but the present invention may be applied to an arcade game machine installed in an amusement arcade or the like.

Further, the description has been given of the example in which a knuckle shot is kicked in a free kick situation, but a similar knuckle shot may be kicked in a situation in which a soccer match is in progress at the position of the virtual camera 48 illustrated in FIG. 4. Even in this case, in the same manner as in this embodiment, the ball object 42 only needs to be moved based on the initial position acquired by the position acquiring unit 64 and the initial direction acquired by the direction acquiring unit 66.

Further, in this embodiment, the example in which the trajectory of a knuckle shot is calculated according to the flow chart illustrated in FIG. 8 has been given. However, it is only necessary to move the ball object 42 so as to form a trajectory like a trajectory of a real knuckle shot through a method set in advance based on the initial position and the initial direction, and hence the present invention is not limited thereto. For example, by referring to player parameters of the operation subject player, weighting may be applied so that a swerving direction varies depending on whether the player is right-footed or left-footed.

2. Second Embodiment

Hereinafter, a description is given of a second embodiment. In the first embodiment, if an instruction for a knuckle shot is given from the controller 22, the moving direction of the ball object 42 is randomly changed for every predetermined number of frames. In this regard, the second embodiment has a feature in that, before the movement of the ball object 42 is started, the trajectory of the ball object 42 is calculated in advance.

It should be noted that a hardware configuration and a functional block diagram of a game device 10 according to the second embodiment are the same as in the first embodiment (see FIGS. 1 to 3 and FIG. 6), and hence the description thereof is omitted herein. Further, in the game device 10 according to the second embodiment also, a soccer game, for example, is executed.

2-1. Processing to be Executed on Game Device

Figure 12:
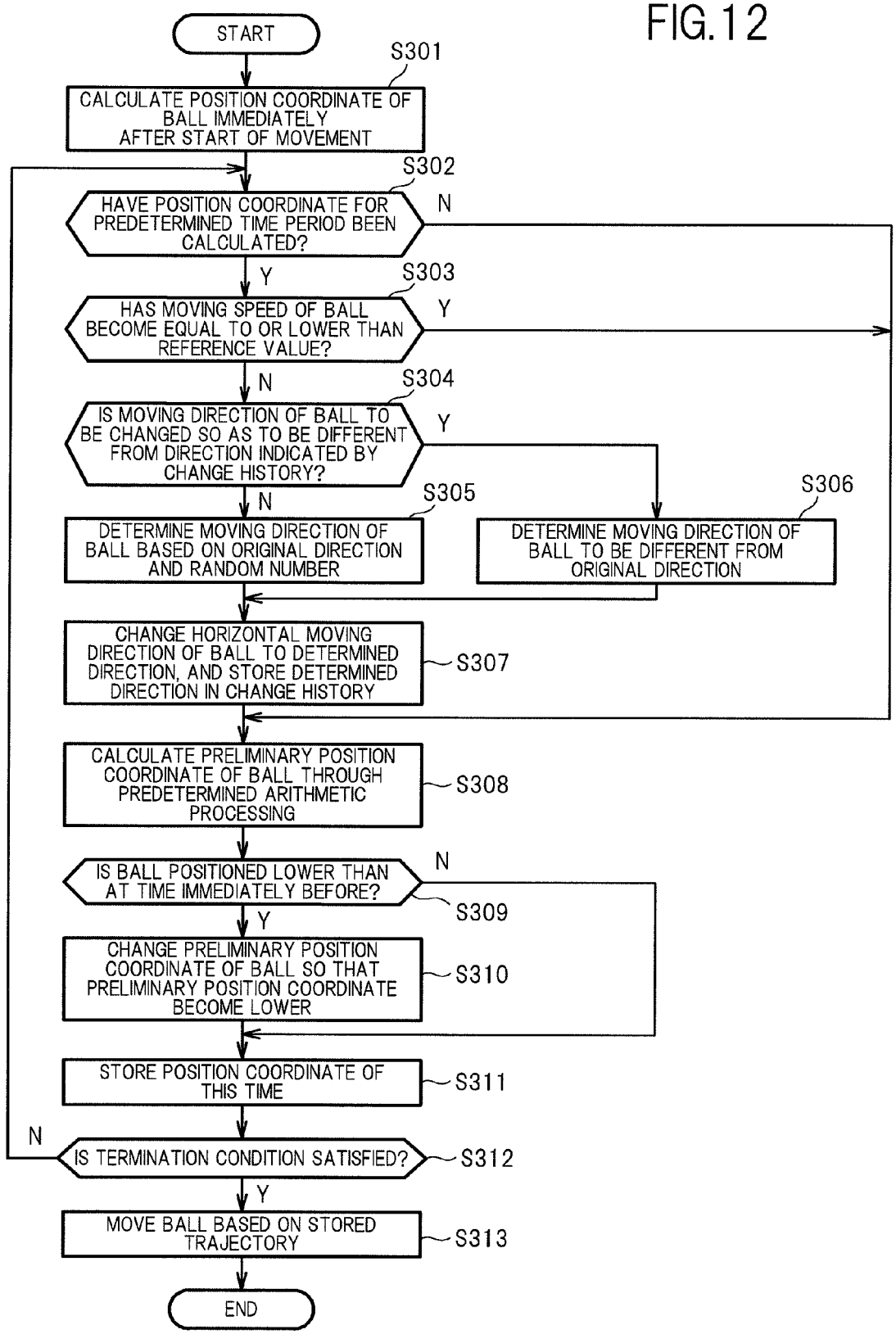
FIG. 12 is a flow chart illustrating an example of processing to be executed on a game device according to a second embodiment.

Processing illustrated in FIG. 12 corresponds to the processing illustrated in FIG. 8 according to the first embodiment. In other words, the processing illustrated in FIG. 12 is the processing to be executed in S110 illustrated in FIG. 7. In the processing illustrated in FIG. 12 according to the second embodiment, the movement control unit 68 (trajectory calculating means) calculates a trajectory before the movement of the ball object 42 is started, and based on the calculated trajectory, causes the ball object 42 to move.

As illustrated in FIG. 12, the microprocessor 13 calculates a position coordinate of the ball object 42 immediately after the start of the movement (S301). Specifically, similarly to S201, the microprocessor 13 uses the initial position acquired in S101 as the starting point, and calculates the position coordinate which is apart from the initial position by a predetermined distance corresponding to the moving speed of the ball object 42 in the initial direction acquired in S106 or S107.

Specifically, when a predetermined time interval (for example, 1/60 of a second) elapses after the operation subject player kicks the ball, the position coordinate at which the ball object 42 is to be displayed is calculated. The calculated position coordinate and the moving direction are stored in the main memory 14 in association with the above-mentioned time. Further, the moving speed of the ball object 42 at this time is calculated in the same manner as in S201 and stored in the main memory 14.

Next, the microprocessor 13 judges whether or not the position coordinate for changing the moving direction of the ball object 42 for a predetermined time period has been calculated (S302). Similarly to S202, a value set in advance may be used as the predetermined time period, and is, for example, 1/10 of a second or the like.

Subsequent steps of S303 to S310 are substantially the same as the steps of S203 to S210, respectively. In S203 to S210, the position coordinate of the ball object 42 to be displayed in the next frame on the display unit 30 is calculated, whereas in S303 to S310, the position coordinate of the ball object 42 to be displayed on the display unit 30 at the predetermined time interval after the ball object 42 starts to move is calculated. For example, if the predetermined time interval is 1/60 of a second, the position coordinate at which the ball object 42 is to be displayed m/60 seconds (m is a natural number) after the ball object 42 is kicked by the operation subject player and starts to move is calculated in S303 to S310.

If the position coordinate for the predetermined time period has been calculated (Y in S302), the microprocessor 13 judges whether or not the moving speed of the ball object 42 is equal to or lower than the reference value (S303). In S303, the microprocessor 13 judges whether or not the moving speed of the ball object 42, which is stored in the main memory 14, is equal to or lower than the reference value.

If the moving speed of the ball object 42 is not equal to or lower than the reference value (N in S303), the microprocessor 13 judges, based on the change history stored in the game data storage unit 60, whether or not the moving direction of the ball object 42 is to be changed so as to be different from a direction indicated by the change history (S304). The processing of S304 is the same as that of S204.

If the moving direction of the ball object 42 is not changed so as to be different from the direction indicated by the change history (N in S304), the microprocessor 13 (the movement control unit 68 as determination means) determines the moving direction of the ball object 42 based on the original moving direction and the random number (S305).

S305 is different from S205 in that the moving direction of the ball object 42 obtained (m−1)/60 seconds after the start of the movement is set as the original moving direction. For the original moving direction, a value stored in the main memory 14 is referred to. Specifically, in S305, the moving direction of (m−1)/60 seconds after the start of the movement is determined.

On the other hand, if the moving direction of the ball object 42 is changed so as to be different from the direction indicated by the change history (Y in S304), the microprocessor 13 determines the moving direction of the ball object 42 to be different from the original horizontal moving direction (S306). In S306, the same processing as in S206 is performed.

The microprocessor 13 changes the horizontal moving direction of the ball object 42 to the determined direction, and then stores the horizontal moving direction in the change history (S307). Specifically, the microprocessor 13 changes the horizontal moving direction to the direction determined in S305 or S306, and then stores the direction in the change history.

Next, the microprocessor 13 (the movement control unit 68 as trajectory calculating means) calculates the preliminary position coordinate at which the ball object 42 is to be displayed m/60 seconds after the start of the movement (S308). S308 is different from S208 in that the preliminary position coordinate is calculated based on the position coordinate at a past time which is stored in the main memory 14.

The microprocessor 13 judges whether or not the position coordinate of the ball object 42 is lower than at a time immediately before (S309). In S309, a comparison is made between the position coordinate of the ball object 42 (m−1)/60 seconds after the start of the movement and the preliminary position coordinate.

If the position coordinate of the ball object 42 is lower (Y in S309), the microprocessor 13 (the movement control unit 68 as vertical position changing means) performs control so that the preliminary position coordinate become lower (S310). In S310, the same processing as in S210 is performed. If the position coordinate of the ball object 42 is higher (N in S309), the control of S310 is not performed.

In S311, the microprocessor 13 stores the preliminary position coordinate calculated in S308 or the position coordinate corrected in S310 in the main memory 14 in association with the time (S311). Specifically, the position coordinate of the ball object 42 of m/60 seconds after the start of the movement is stored in the main memory 14. The position coordinate stored in the main memory 14 in S311 constitutes a trajectory of the ball object 42. Specifically, a line obtained by connecting the position coordinates in time sequence forms the same trajectory as the trajectory C1 illustrated in FIG. 9 and the trajectory C3 illustrated in FIG. 10.

The microprocessor 13 judges whether or not a termination condition is satisfied (S312). If the termination condition is not satisfied (N in S312), the processing returns to S302, in which the microprocessor 13 performs the calculation processing on the position coordinate of the ball object 42 at the next time interval (specifically, (m+1)/60 seconds after the start of the movement).

On the other hand, if the termination condition is satisfied (Y in S312), when the operation subject player kicks the ball object 42, the microprocessor 13 causes the ball object 42 to move based on the trajectory stored in the main memory 14 (S313).

2-2. Summary of Second Embodiment

In the game device 10 according to the second embodiment described above, the moving direction of the ball object 42 is changed a plurality of times to the moving direction determined based on the original moving direction and the random number. The microprocessor 13 changes the trajectory of the knuckle shot for every predetermined time period, and is capable of calculating the trajectory in advance before the movement of the ball object 42 is started.

After the operation subject player kicks a shot, the ball object 42 moves based on this trajectory. With the game device 10 according to the second embodiment, it is possible to make a knuckle shot which forms a trajectory unpredictable for the user unlike the normal shot, the straight shot, or the like.

Further, in this embodiment, similarly to the first embodiment, as illustrated in FIG. 7, after the shot instruction button is depressed, and the operation subject player starts the preparation action, the processing of S110 is executed. However, before the shot instruction button is depressed, the initial direction may be acquired based on the pointing information specified by the cursor 52, to thereby execute the same processing as in S110.

In the above-mentioned case, before the shot instruction button is depressed, the trajectory of the knuckle shot may be predicted and calculated in advance. The calculated trajectory may be displayed on the game screen illustrated in FIG. 5. For example, if the knuckle shot instruction button is depressed, the calculated trajectory is displayed in iridescent color. The user may depress the shot instruction button after checking the trajectory of the knuckle shot in advance. When the operation subject player kicks a knuckle shot or the like, the initial direction is acquired in S106 or S107, and then in S110, the trajectory is recalculated.

Further, also in S111 and S112, in the same manner as in S110, before the movement of the ball object 42 is started, the trajectories of the normal shot and the straight shot may be calculated. In the same manner as in S110, before the shot instruction button is depressed, the respective trajectories may be displayed in red after the calculation.

Further, in the second embodiment, the moving direction of the knuckle shot is determined as in S305 or S306. However, for example, a mathematical expression may be set in advance to calculate a trajectory so that the trajectory becomes closely similar to the trajectory of a real knuckle shot. A random number may be generated at a time at which the shot instruction button is depressed or at another time, to thereby change a factor of the mathematical expression based on the generated random number.

3. Third Embodiment

Hereinafter, a description is given of a third embodiment. In the first embodiment and the second embodiment, after the shot instruction button of the controller 22 is depressed, the initial direction is acquired in S106 or S107. In this regard, the third embodiment has a feature in that, when it is judged that the operation subject player is feeling pressure, the controller 22 is caused to vibrate.

After the controller 22 is caused to vibrate, an initial direction is acquired. It should be noted that a hardware configuration of a game device 10 according to the third embodiment is the same as in the first embodiment (see FIGS. 1 to 3), and hence the description thereof is omitted herein. Further, in the game device 10 according to the third embodiment, a soccer game, for example, is executed as well.

3-1. Functions to be Implemented on Game Device

Figure 13:
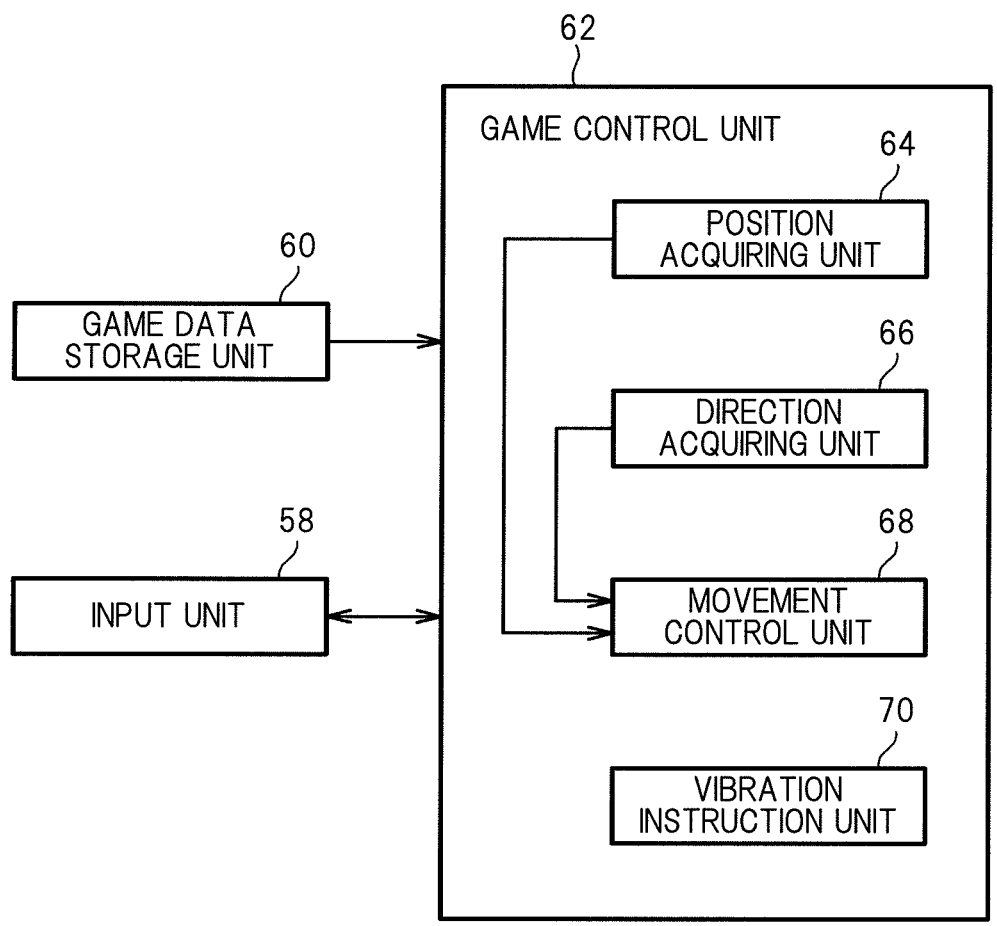
FIG. 13 is a functional block diagram illustrating a group of functions to be implemented on a game device according to a third embodiment.

FIG. 13 is a functional block diagram illustrating a group of functions to be implemented on the game device 10. As illustrated in FIG. 13, the game device 10 according to the third embodiment includes a vibration instruction unit 70, which is a difference from the game devices 10 of the first embodiment and the second embodiment.

[Vibration Instruction Unit]

The vibration instruction unit 70 is configured by the microprocessor 13 or the like, and if a predetermined condition is satisfied, causes the controller 22 to vibrate in a period starting when the operation subject player starts the approach run and ending when the operation subject player kicks the ball object 42.

The predetermined condition is for judging whether or not the operation subject player is feeling pressure. For example, the predetermined condition is a condition regarding a parameter, such as whether or not the value of a player parameter falls within a reference range, a condition regarding whether or not the game situation is a predetermined situation, or a condition regarding a position at which a shot is aimed, such as whether or not the cursor 52 is within a predetermined region.

The condition regarding whether or not the game situation is a predetermined situation relates to, for example, whether or not a score difference is smaller than a predetermine value, whether or not a remaining time is smaller than a predetermined value, whether or not the initial position is located at a place where scoring a goal is easy, or the like. Whether or not the cursor 52 is within a predetermined region relates to whether or not the cursor 52 is located at a place where scoring a goal is difficult, such as a corner of the goal object 40.

If the operation subject player is feeling pressure, the vibration instruction unit 70 inputs a signal for causing the controller 22 to vibrate to the controller 22.

3-2. Processing to be Executed on Game Device

Figure 14:
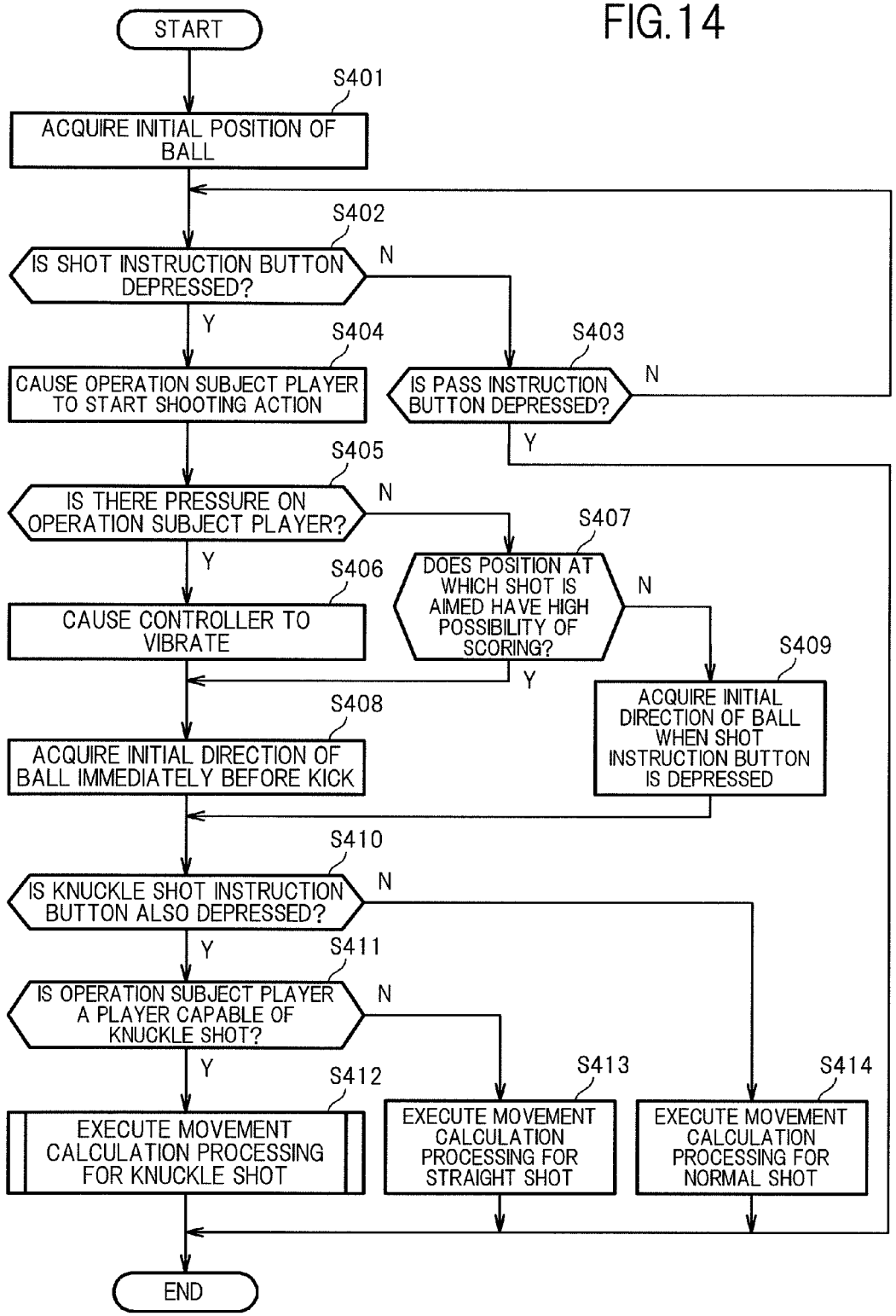
FIG. 14 is a flow chart illustrating an example of processing to be executed on the game device according to the third embodiment.

FIG. 14 is a flow chart illustrating an example of processing to be executed on the game device 10 according to the third embodiment. The processing of FIG. 14 is executed by the microprocessor 13 operating according to programs. It should be noted that the processing illustrated in FIG. 14 corresponds to the processing illustrated in FIG. 7. Specifically, the processing illustrated in FIG. 14 is processing to be executed when the game screen for a free kick (FIG. 5) is displayed on the display unit 30.

As illustrated in FIG. 14, processing steps of S401 to S403 are the same as in S101 to S103, respectively, and hence the description thereof is omitted.

If the shot instruction button is depressed (Y in S402), the microprocessor 13 judges whether or not there is pressure on the operation subject player (S405). Specifically, as described above, this judgment is made based on whether or not a parameter (for example, a parameter relating to how easily the operation subject player feels pressure) of the operation subject player is equal to or larger than a predetermined threshold.

It should be noted that in S405, the judgment only needs to be made based on a method set in advance, and thus the present invention is not limited to the above-mentioned method. For example, the judgment may be made based on whether or not a parameter of the operation subject player satisfies a predetermined mathematical expression. In addition, if the shot instruction button is not depressed for a predetermined period of time after the game screen for a free kick (FIG. 5) is displayed on the display unit 30, it may be judged that there is pressure.

If there is pressure on the operation subject player (Y in S405), the microprocessor 13 (the vibration instruction unit 70) inputs a signal for causing the controller 22 to vibrate via the controller interface 20, to thereby cause the controller 22 to vibrate (S406). Specifically, the microprocessor 13 inputs, to the controller 22, a signal for causing a vibrator included in the controller 22 to vibrate for a predetermined period of time.

If the controller 22 receives the signal, the controller 22 causes the vibrator included in the controller 22 to vibrate. In other words, after the shot instruction button is depressed and the operation subject player starts the approach run for a free kick, the controller 22 vibrates.

It should be noted that the controller 22 may vibrate at an arbitrary time in a period starting when the operation subject player starts the approach run and ending when the operation subject player kicks the ball object 42. For example, if it is judged that the operation subject player is feeling intense pressure, the controller 22 is caused to vibrate at a time close to a time at which the operation subject player kicks the ball object 42 (reference time). Whether or not the operation subject player is feeling intense pressure is judged based on, for example, whether or not a parameter of the operation subject player exceeds a predetermined value by a given amount or more. By vibrating the controller 22 at the time close to the reference time, the position at which the user is aiming a shot may be displaced, and hence it is possible to realize the player's state of feeling enormous pressure.

On the other hand, if there is no pressure on the operation subject player (N in S405), the processing proceeds to S407. The processing steps of S407 to S414 are the same as in S105 to S112, respectively, and hence the description thereof is omitted. It should be noted that in S412, the processing illustrated in FIG. 12 may be executed.

3-3. Summary of Third Embodiment

As described above, in the game device 10 according to the third embodiment, the microprocessor 13 acquires the initial direction at the reference time. Further, with the game device 10, if the operation subject player is feeling pressure, the controller 22 vibrates in the period starting when the operation subject player starts the approach run and ending when the operation subject player kicks the ball object 42.

The position of the cursor 52 specified by the user via the controller 22 also sways, and hence the position at which the user is aiming a shot may be displaced. In other words, it is possible to virtually realize, in the game, a situation in which the player misses a shot due to pressure of a tense moment, like a real soccer player.

Here, in the third embodiment, if the operation subject player is feeling pressure, the controller 22 is caused to vibrate. However, it is only necessary to input a predetermined instruction signal to the controller 22, and the method of expressing pressure is not limited thereto. For example, a beep may be generated from the controller 22 or the audio outputting unit 31.

4. Fourth Embodiment

Hereinafter, a description is given of a fourth embodiment. The third embodiment has a feature in that, if the operation subject player is feeling pressure, the controller 22 is caused to vibrate. The fourth embodiment is different from the third embodiment in that if the operation subject player is feeling pressure, the cursor 52 (indicator) is displayed at a position different from the position corresponding to the pointing information.

It should be noted that a hardware configuration of a game device 10 according to the fourth embodiment is the same as in the first embodiment (see FIGS. 1 to 3), and hence the description thereof is omitted herein. Further, in the game device 10 according to the fourth embodiment, a soccer game is also executed for example.

4-1. Functions to be Implemented on Game Device

Figure 15:
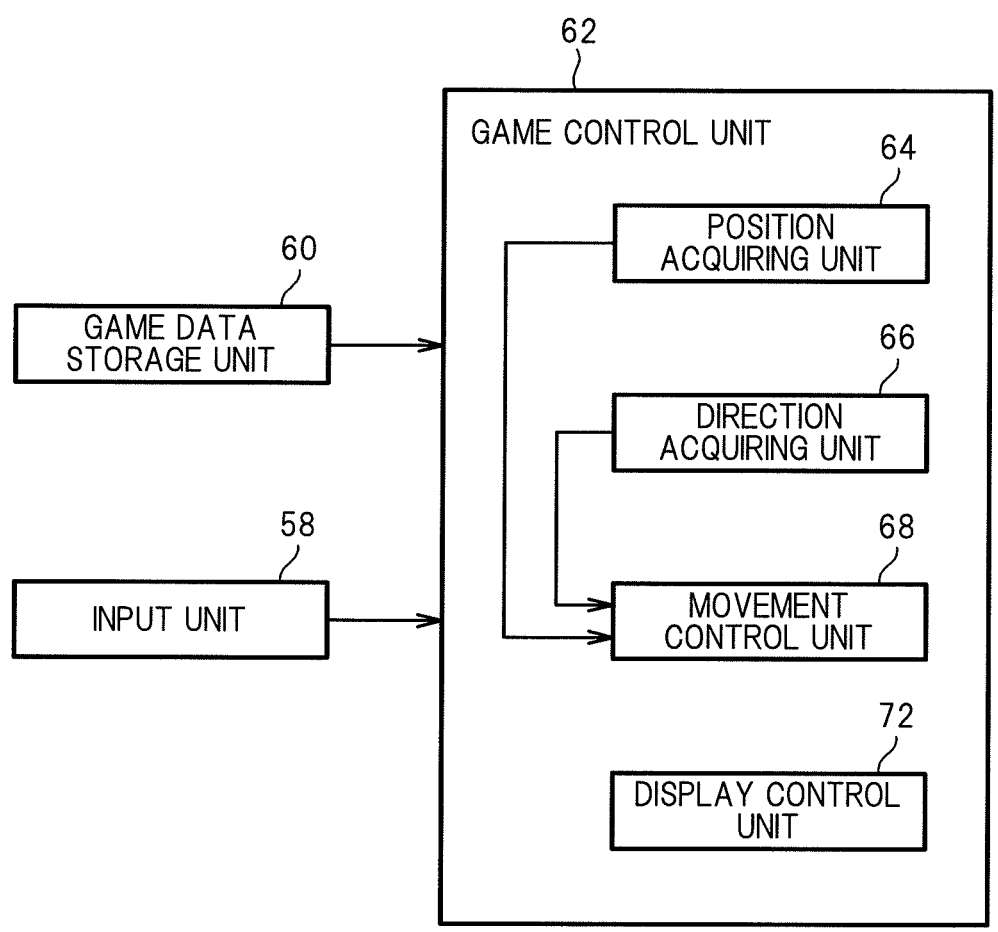
FIG. 15 is a functional block diagram illustrating a group of functions to be implemented on a game device according to a fourth embodiment.

FIG. 15 is a functional block diagram illustrating a group of functions to be implemented on the game device 10. As illustrated in FIG. 15, the game device 10 according to the fourth embodiment includes a display control unit 72, which is a difference from the game devices 10 of the first embodiment and the second embodiment.

[Display Control Unit]

The display control unit 72 is configured by the microprocessor 13 or the like, and if a predetermined condition is satisfied, causes the cursor 52 to be displayed at a position different from the position corresponding to the pointing information. The predetermined condition is similar to that of the third embodiment, and is for judging whether or not the operation subject player is feeling pressure.

4-2. Processing to be Executed on Game Device

Figure 16:
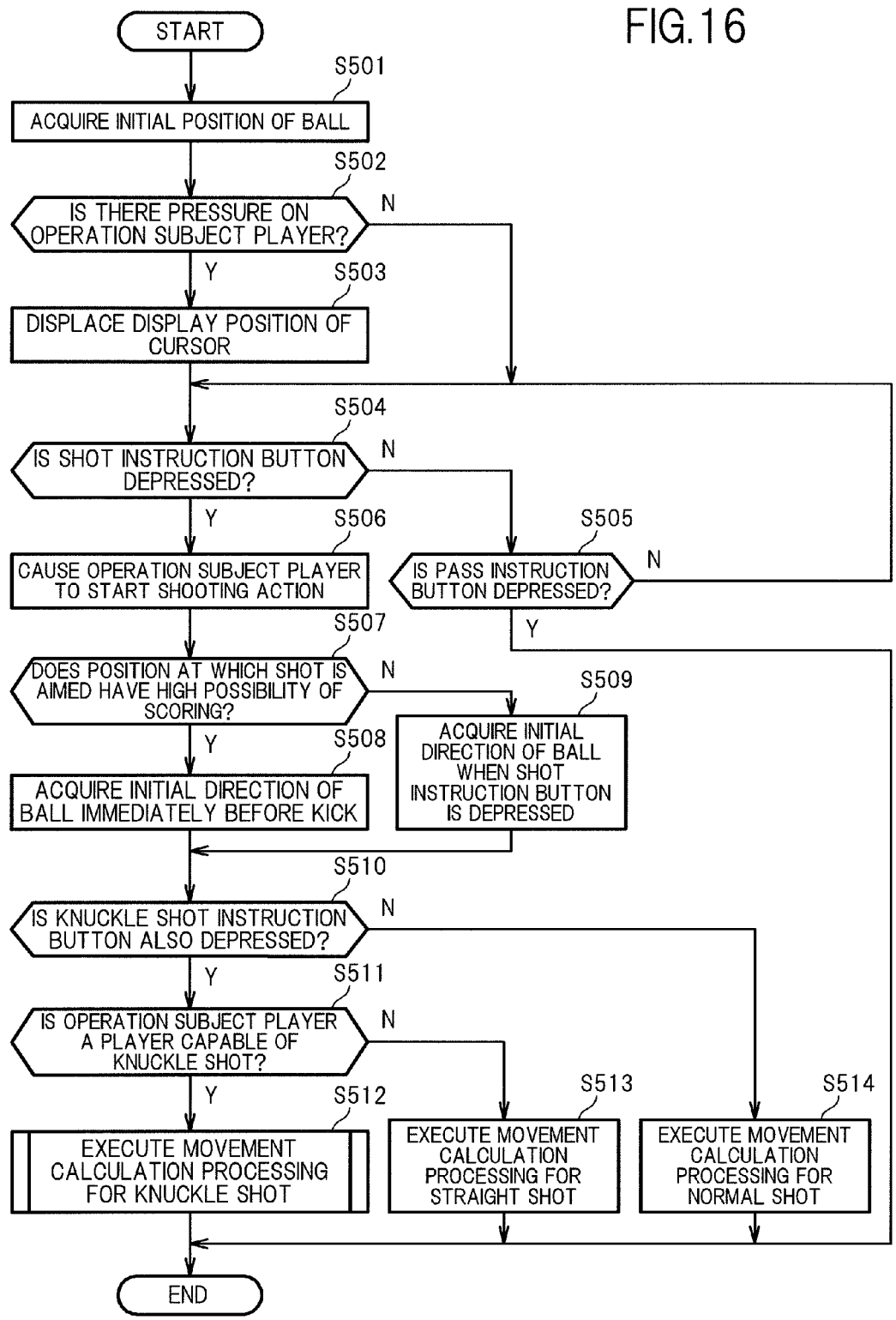
FIG. 16 is a flow chart illustrating an example of processing to be executed on the game device according to the fourth embodiment.

FIG. 16 is a flow chart illustrating an example of processing to be executed on the game device 10 according to the fourth embodiment. The processing of FIG. 16 is executed by the microprocessor 13 operating according to programs. It should be noted that the processing illustrated in FIG. 16 corresponds to the processing illustrated in FIG. 7. Specifically, the processing illustrated in FIG. 16 is processing to be executed when the game screen for a free kick (FIG. 5) is displayed on the display unit 30.

As illustrated in FIG. 16, processing steps of S501 and S502 are the same as in S101 and S405, respectively, and hence the description thereof is omitted.

If there is pressure on the operation subject player (Y in S502), the microprocessor 13 (the display control unit 72) causes the cursor 52 to be displayed at a position different from the position corresponding to the pointing information (S503). Specifically, for example, the cursor 52 is displayed at a position obtained by displacing the position corresponding to the pointing information by a predetermined distance in a predetermined direction. As the direction and distance for the displacement of the cursor 52, a value set in advance may be used. Alternatively, the position of the cursor 52 may be determined as a position selected randomly within a circle which has the position corresponding to the pointing information as a center thereof and has a predetermined radius.

It should be noted that in S503, depending on the degree (intensity) of pressure being felt by the operation subject player, how the cursor 52 is displaced may be changed. For example, if a parameter corresponding to the pressure on the operation subject player exceeds a reference value by a significant amount (for example, 200% of reference value), a displacement distance is doubled compared to a case where the parameter exceeds the reference value by a slight amount (for example, 130% of reference value). As the player is feeling more intense pressure, the position at which the shot is aimed can be largely displaced.

On the other hand, if there is no pressure on the operation subject player (N in S502), the processing proceeds to S504. The processing steps of S504 to S514 are the same as in S102 to S112, respectively, and hence the description thereof is omitted. It should be noted that in S512, similarly to S412, the processing illustrated in FIG. 12 may be executed.

4-3. Summary of Fourth Embodiment

As described above, in the game device 10 according to the fourth embodiment, if the operation subject player is feeling pressure, the cursor 52 is displaced to a position different from the position corresponding to the pointing information, and is then displayed.

Because the cursor 52 is displayed at a position different from the position at which the cursor 52 is originally to be displayed, it is possible to displace the position at which the user is aiming a shot. Specifically, the initial direction is acquired based on a value different from the pointing information intended by the user. Hence, it is possible to virtually realize, in the game, a situation in which the player misses a shot due to pressure of a tense moment, like a real soccer player.

In the first to fourth embodiments, the example of executing a soccer game has been provided, but the present invention is also applicable to another game (for example, ice hockey) which is played by using a moving object other than a soccer ball. For example, in a baseball game, the same processing may be applied to processing of displaying a knuckle ball thrown by a pitcher.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game of a sport to be played by using a moving object, the game device comprising:
    a position acquiring unit that acquires an initial position of the moving object when the moving object starts to move in a game space;
    a direction acquiring unit that acquires an initial direction of the moving object when the moving object starts to move in the game space; and
    a controller that controls the moving object to start to move based on the initial position and the initial direction, and repeatedly generates a new random number and repeatedly calculates a moving direction of the moving object in flight based on the generated new random number and moves the moving object according to the calculated moving direction.

2. The game device according to claim 1, wherein the controller restricts changing the moving direction in a case where a moving speed of the moving object is equal to or less than a reference value.

3. The game device according to claim 1, wherein the controller further comprises vertical position changing unit that calculates a preliminary position coordinate to which the moving object is to be moved based on predetermined arithmetic processing and, in a case where the preliminary position coordinate is vertically lower than an immediately-previous position of the moving object, controls so that the moving object is moved to a position lower in a vertical direction than the calculated preliminary position coordinate.

4. The game device according to claim 1, wherein:
the game device further comprises a storage unit that stores a change history to which the calculated moving direction is added; and
the controller changes the moving direction of the moving object based on the change history.

5. The game device according to claim 1, wherein:
the game device further comprises a pointing device that inputs position data regarding a position on a game screen, which is specified by a user, and in a case where a first input is received from the pointing device, the pointing device causes a game character to start a preparation action;
the direction acquiring unit acquires the initial direction based on the position data input at a reference time after the game character starts the preparation action; and
the game device further comprises vibration instruction unit that, in a case where a predetermined condition is satisfied, vibrates the pointing device in a period starting when the game character starts the preparation action and ending when the reference time is reached.

6. The game device according to claim 1, wherein:
the game device further comprises:
a pointing device that inputs position data regarding a position on a game screen, which is specified by a user; and
display control unit that displays an indicator at a position corresponding to the position data;
the direction acquiring unit acquires the initial direction based on the position data; and
the display control unit displays, in a case where a predetermined condition is satisfied, the indicator at a position displaced from the position corresponding to the position data.

7. The game device according to claim 1, wherein the controller determines the moving direction of the moving object for every predetermined number of frames based on the original moving direction of the moving object and the new random number after the controller controls the moving object to start to move, and changes the moving direction of the moving object to the determined moving direction.

8. The game device according to claim 1, wherein:
the controller calculates, before controlling the moving object to start to move, a trajectory along which the moving object is to move;
controls the moving object to move based on the calculated trajectory; and
the controller calculates the trajectory by determining the moving direction of the moving object for every predetermined time period based on the original moving direction of the moving object and the new random number, and calculates the trajectory based on the determined moving direction.

9. The game device according to claim 1, wherein the new random number is generated based on a time function.

10. The game device according to claim 1, wherein the moving direction is calculated by rotating a previous moving direction by an angle determined based on a sign and a value of the new random number.

11. A control method for a game device that includes at least one processor and executes a game of a sport to be played by using a moving object, the method comprising:
acquiring, using the at least one processor, an initial position of the moving object when the moving object starts to move in a game space;
acquiring, using the at least one processor, an initial direction of the moving object when the moving object starts to move in the game space; and
controlling, using the at least one processor, the moving object to start to move based on the initial position and the initial direction, and
repeatedly generating a new random number and repeatedly calculating a moving direction of the moving object in flight based on the generated new random number and moving the moving object according to the calculated moving direction.

12. A non-transitory computer-readable information storage medium having a program recorded thereon, the program causing a computer to function as a game device for executing a game of a sport to be played by using a moving object,
the program further causing the computer to function as:
position acquiring unit that acquires an initial position of the moving object when the moving object starts to move in a game space;
direction acquiring unit that acquires an initial direction of the moving object when the moving object starts to move in the game space; and
a controller that controls the moving object to start to move based on the initial position, and repeatedly generates a new random number and repeatedly recalculates a moving direction of the moving object in flight based on the generated new random number and moves the moving object according to the calculated moving direction.

13. A game device comprising:
a controller configured to:
acquire an initial position and an initial direction of a moving object when the moving object starts to move in a game space,
control the moving object to start to move based on the initial position and the initial direction, and
repeatedly generate a new random number and repeatedly calculate a moving direction of the moving object in flight based on the generated new random number and move the moving object according to the recalculated moving direction.

14. A control method for a game device that includes at least one processor, the control method comprising:
acquiring, using the at least one processor, an initial position and an initial direction of a moving object when the moving object starts to move in a game space;
controlling, using the at least one processor, the moving object to start to move based on the initial position and the initial direction; and
repeatedly generating, using the at least one processor, a new random number and repeatedly calculating a moving direction of the moving object in flight based on the generated new random number and moving the moving object according to the calculated moving direction.

15. A non-transitory computer-readable information storage medium having a program recorded thereon, the program causing a computer to function as a game device, the program further causing the computer to function as:
an acquirer that acquires an initial position and an initial direction of a moving object when the moving object starts to move in a game space; and
a controller that controls the moving object to start to move based on the initial position and the initial direction, repeatedly generates a new random number and repeatedly calculates a moving direction of the moving object in flight based on the generated new random number, and moves the moving object according to the calculated moving direction.

* * * * *